(12) United States Patent
Arai et al.

(10) Patent No.: US 6,410,673 B1
(45) Date of Patent: Jun. 25, 2002

(54) ETHYLENE/AROMATIC VINYL COPOLYMER AND MOLDED PRODUCT THEREOF

(75) Inventors: Toru Arai; Masataka Nakajima; Toshiaki Otsu; Takeshi Oda; Takanori Naoe; Yukiko Nishitoba, all of Machida (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,812
(22) PCT Filed: Oct. 18, 1999
(86) PCT No.: PCT/JP99/05733
§ 371 (c)(1), (2), (4) Date: Jun. 19, 2000
(87) PCT Pub. No.: WO00/23484
PCT Pub. Date: Apr. 27, 2000

(30) Foreign Application Priority Data

Oct. 19, 1998 (JP) .............................. 10-29755
Mar. 15, 1999 (JP) .............................. 11-68662
Apr. 2, 1999 (JP) .............................. 11-96002

(51) Int. Cl.$^7$ .............................. C08F 212/02
(52) U.S. Cl. ....................... 526/347; 526/346; 428/220; 428/910
(58) Field of Search .............. 526/347, 346; 428/220, 910

(56) References Cited

U.S. PATENT DOCUMENTS

| 5,652,315 | A | 7/1997 | Inoue, et al. .......... 526/160 X |
| 5,883,213 | A | 3/1999 | Arai et al. |
| 6,066,709 | A | 5/2000 | Arai et al. |
| 6,235,855 | B1 * | 5/2001 | Arai et al. .............. 526/347 X |

FOREIGN PATENT DOCUMENTS

| DE | 19711339 A1 | 10/1997 |
| JP | 10-60051 A | 3/1998 |

OTHER PUBLICATIONS

U.S. application No. 09/048,000, filed Mar. 26, 1998, pending.
U.S. application No. 09/390,711, filed Sep. 07, 1999, pending.
U.S. application No. 09/163,603, filed Sep. 30, 1998, pending.
U.S. application No. 09/514,548, filed Feb. 28, 2000, pending.
U.S. application No. 09/581,812, filed Jun. 19, 2000, pending.
U.S. application No. 09/616,077, filed Jul. 13, 2000, pending.

* cited by examiner

Primary Examiner—Fred Teskin
(74) Attorney, Agent, or Firm—Oblon, Spivak, McClelland, Maier & Neustadt, P.C.

(57) ABSTRACT

An ethylene-aromatic vinyl compound copolymer characterized by satisfying the following conditions:

(1) the aromatic vinyl compound content is from 0.5 mol % to 10 mol %;
(2) as measured with respect to a molded product having a thickness of 0.2 mm, the haze is at most 14%, or the total light transmittance is at least 90%;
(3) an ethylene-aromatic vinyl compound copolymer characterized in that the relation of the aromatic vinyl compound content and the glass transition point (Tg) obtained by an inflection point method as observed at a temperature of at least −50° C. by a differential scanning calorimeter (DSC), satisfies the following formula (1):

$$-20+1.00St > Tg > -30+1.05St \quad \text{Formula (1)}$$

wherein St represents the aromatic vinyl compound content (molar fraction %) in the copolymer; and (4) the weight average molecular weight is from 140,000 to 500,000 when the aromatic vinyl compound content is from 5 mol % to 10 mol %, or from 60,000 to 500,000 when the content is from 0.5 mol % to less than 5 mol %.

21 Claims, 1 Drawing Sheet

ETHYLENE/AROMATIC VINYL COPOLYMER AND MOLDED PRODUCT THEREOF

TECHNICAL FIELD

The present invention relates to an ethylene-aromatic vinyl compound copolymer which has an aromatic vinyl compound content of from 0.5 to 10 mol % and which has a high transparency, a glass transition point represented by a specific formula and a high molecular weight, and a molded product, particularly a film, a sheet or a tube, employing such a copolymer and having high mechanical properties, melting point, etc.

BACKGROUND ART

Ethylene-styrene Copolymer

An ethylene-styrene copolymer employing a so-called Ziegler-Natta catalyst, is obtainable as a mixture with a homopolymer component such as polyethylene or polystyrene, and its compositional distribution is large, whereby it has problems with respect to transparency, mechanical properties, etc. Recently, styrene-ethylene copolymers obtainable by using a so-called homogeneous Ziegler-Natta catalyst system comprising a transition metal catalyst component and an organic aluminum compound, and methods for their production have been known.

JP-A-3-163088 and JP-A-7-53618 disclose a styrene-ethylene copolymer wherein no normal styrene chain exists, i.e. a pseudo random copolymer, which is obtainable by using a complex having a so-called constrained geometrical structure. Here, a normal St chain means a chain of head-to-tail bonding. Further, in the following, styrene may sometimes be represented by St. The pseudo random copolymer is defined to be a copolymer in which no head-to-tail styrene chain structure is contained, and phenyl groups in the alternating structure of styrene-ethylene present in this pseudo random copolymer, have no stereoregularity. Further, as no normal styrene chain exists, the content of styrene can not exceeds 50 mol %. Such a pseudo random copolymer is not sufficiently satisfactory with respect to the mechanical properties such as breaking strength or solvent resistance.

JP-A-6-49132 and Polymer Preprints, Japan, 42, 2292 (1993) disclose a method for producing a similar styrene-ethylene copolymer wherein no normal St chain exists, i.e. a so-called pseudo random copolymer, by means of a catalyst comprising a cross-linked metallocene type Zr complex and a co-catalyst.

According to Polymer Preprints, Japan, vol. 42, 2292 (1993), phenyl groups in the alternating structure of styrene-ethylene present in this pseudo random copolymer, have no substantial stereoregularity. Further, like the case of a complex having a constrained geometrical structure, as no normal styrene chain exists, the content of styrene can not exceed 50 mol %. The activity is also practically inadequate.

Further, recently, a styrene-ethylene copolymer close to an alternating copolymer having a stereoregularity has been reported which is obtainable under a cryogenic condition (−25° C.) by means of a specific crosslinked bisindenyl type Zr complex i.e. rac[ethylenebis(indenyl)zirconium dichloride]. (Macromol. Chem., Rapid Commun., vol. 17,745 (1996).)

However, from the disclosed 13C-NMR spectrum and from the description of the article, it is evident that in this copolymer, no head-to-tail styrene chain exists.

Further, if copolymerization is carried out at a polymerization temperature of at least room temperature by means of this complex, it is only possible to obtain a copolymer having a low styrene content and a low molecular weight.

Further, with styrene-ethylene copolymers obtained by using the foregoing respective catalyst systems, transparency is not good especially in a relatively low styrene content range. This is considered attributable to non uniformity of the compositional distribution, etc. of the copolymers, i.e. due to the fact that a component having a styrene content lower or higher than average, is present relatively abundantly.

WO98/09999 discloses a styrene-ethylene copolymer obtainable by means of a specific zirconocene complex {rac-dimethylsilylenebis(2-methyl,4-phenyl-1-indenyl) zirconium dichloride}. This copolymer has a wide molecular weight distribution and a large compositional distribution. The copolymer having a styrene content of about 10 mol % also contains a polyethylene component and thus is an opaque copolymer.

The present inventors have heretofore proposed a catalyst system for ethylene-styrene copolymerization and an ethylene-styrene copolymer as described below.

JP-A-9-309925 which is an application filed by the present inventors, discloses a novel ethylene-styrene copolymer having a styrene content of from 1 to 50 mol %, an isotactic stereoregularity in the styrene-ethylene alternating structure and an alternating index (value $\lambda$ in this specification) of the copolymer of at most 70, which is obtainable by using a polymerization catalyst comprising a zirconocene complex having an indenyl group crosslinked with an isopropylidene group, and a co-catalyst. The copolymer obtainable by this catalyst has good transparency and mechanical properties, but when it is attempted to obtain a copolymer having a styrene content of at most 10 mol %, it is difficult to obtain a copolymer having a high molecular weight required to have an inflation molding property or an adequate physical property as a molded product under a polymerization condition of at least about 30° C. at which the catalyst exhibits a practical activity.

EP-872492 discloses a method for producing an ethylene-styrene copolymer having an optional composition by using a zirconocene catalyst having, as a ligand, a benzoindenyl group having a crosslinked structure.

Film of an Ethylene-styrene Copolymer

A film is known which employs a so-called pseudo random ethylene-styrene copolymer having no head-to-tail styrene chain and no stereoregularity derived from styrene units. For example, U.S. Pat. No. 5,703,187 discloses a pseudo random copolymer having a styrene content of from 1.4 to 47 mol % obtained by using a so-called CGCT type catalyst, and a film employing it. JP-A-3-163088 and JP-7-53618 disclose pseudo random copolymers obtainable by means of a so-called CGCT type catalyst and films employing them. WO95/32095 discloses a (multi layer) shrinkable film employing a pseudo random copolymer obtainable by means of a similar CGCT type catalyst.

A copolymer obtained by means of a CGCT catalyst has a drawback that it is poor in the transparency in its application for a film, since it contains a copolymer component having a relatively large compositional distribution of the styrene content and a substantially lower (or higher) styrene content than an average styrene content, especially in the case of a copolymer having a styrene content of at most 20 mol %, particularly at most 10 mol %.

JP-A-10-60051 discloses an ethylene-styrene copolymer obtainable by means of a similar CGCT type catalyst, which is excellent in flexibility and elastic recovery and excellent in transparency and which has a styrene content of particularly preferably from 14 to 30 mol %. However, when the copolymer having a styrene content which is disclosed to be particularly preferred, is employed as a stretch film, the mechanical properties (particularly tensile strength, elastic modulus), the film-forming property and the packaging machine compatibility are not satisfactory, and the elastic modulus in the prescribed styrene content range is too low (the flexibility is too high) as a stretch film. Further, the prescribed glass transition temperature is too low especially in a range where the styrene content is at most 10 mol %. Therefore, it is inadequate with respect to the molding processability as a packaging film, particularly as a stretch packaging film, the softness when it is touched with a hand, and the touched feeling.

Stretch Packaging Film

For stretch packaging, a polyvinyl chloride type film is mainly employed, and an olefin type film made of low density polyethylene, an ethylene-vinyl acetate copolymer, linear low density polyethylene or polypropylene, is partly employed.

However, in recent years, with respect to a polyvinyl chloride film, elusion of a plasticizer contained, or combustion gas formed at the time of incineration has been regarded to be problematic. Further, with a single layer or multi layer stretch film made of low density polyethylene or an ethylene/vinyl acetate copolymer, the stretchability is limited at a level of 150%, and there has been a problem that if stretched beyond the limit, the film will rapture.

Further, in the case of a film made of linear low density polyethylene, after packaging, an excess stress is likely to be exerted to the packaged product, whereby a tray tends to be deformed, the strength after packaging tends to be weak, or the film tends to stretch non-uniformly, whereby the appearance of the product after packaging tends to be poor. If it has an excessive adhesive property, there has been a problem such that a trouble is likely during the production of the film, and the yield tends to be remarkably poor.

Further, the olefin type stretch film has had a problem that since it is inadequate in the finger pressure recovery property, and in its application for food packaging, a non-recoverable dent is likely to be formed in the film by a finger pressure of a consumer during the display of the commercial product, whereby the appearance as a commercial product will be impaired. Further, it has been pointed out that the bottom sealing property is inadequate.

Further, a problem has been pointed out such that when an automatic stretch packaging machine for conventional vinyl chloride type stretching films, is to be used, such a non-vinyl chloride type stretch film using a material having a relatively low initial elastic modulus, is likely to stretch, whereby transportation or cutting tends to be difficult.

From the foregoing, it is desired to develop a base material of a non-vinyl chloride type, which has specific mechanical properties such as an initial elastic modulus, elastic recovery, high transparency and proper temperature-dynamic property simultaneously and which is inexpensive, and a film, particularly a stretch packaging film, employing it.

LLDPE Substitute Polymer

On the other hand, linear low density polyethylene (LLDPE) having an α-olefin such as 1-octene or 1-hexene co-polymerized with ethylene, is widely employed for various molded products, particularly films, as an ethylene type resin which is flexible and has relatively high transparency.

LLDPE produced by a Ziegler-Natta catalyst method, is non-uniform in the co-monomer distribution or in the molecular weight distribution, and accordingly has problems with respect to the mechanical properties, stickiness, transparency, solvent resistance and elution of an oligomer.

On the other hand, LLDPE by a so-called single site catalyst (metallocene catalyst or CGCT catalyst) is known. This LLDPE has more uniform co-monomer distribution and molecular weight distribution and improved mechanical properties, transparency and solvent resistance, and it has been widely employed.

However, in order to obtain higher transparency, it is necessary to increase the α-olefin content and decrease the polyethylene crystallinity, but at a relatively high α-olefin content, the melting point will necessarily lower further, the mechanical properties such as elongation and tensile modulus of elasticity, and the solvent resistance, are also strongly dependent on the contained polyethylene crystal structure and are accordingly bound to lower in a relatively high α-olefin content range. With LLDPE in a relatively low α-olefin content range, the melting point tends to be high, but the transparency is low, and the flexibility tends to be low. Namely, it is difficult to satisfy a high melting point (heat resistance), mechanical properties (tensile modulus of elasticity), solvent resistance and transparency at the same time.

Further, an α-olefin such as 1-hexene or 1-octene is relatively expensive, and a more inexpensive and effective co-monomer is desired. Among copolymers obtainable by means of the above-mentioned single site catalyst (metallocene catalyst, CGCT catalyst) system, a copolymer wherein a styrene content is at least 5 mol %, has a low tensile modulus of elasticity at a level of not more than 50 MPa as compared with conventional LLDPE and is not suitable as a substitute for a transparent soft resin having a high tensile modulus of elasticity such as LLDPE. Further, the melting point and the crystallinity are also not adequate.

DISCLOSURE OF THE INVENTION

It is an object of the present invention to overcome such drawbacks of the prior art and to provide a styrene-ethylene copolymer having a specific composition, a high molecular weight, high transparency and a glass transition point represented by a specific formula and further having a stereo-regularity and a head-to-tail styrene chain structure, and a molded product made thereof. Further, the present invention is to solve the above problems and to provide a film, sheet or tube, particularly a film excellent in a packaging property and touch feeling, especially a stretch packaging film, which has a specific composition, excellent mechanical properties and high transparency and which has an elastic recovery property (finger pressure regaining property), low temperature characteristics and processability. A further object of the present invention is to provide an ethylene type copolymer having a specific composition, a high melting point (heat resistance) and high transparency, and an excellent mechanical property such as a high modulus of elasticity, and a molded product, particularly a film or a sheet, prepared by molding it.

The present invention is a transparent aromatic vinyl compound-ethylene copolymer having a high transparency, which satisfies the following conditions:

(1) the aromatic vinyl compound content is from 0.5 mol % to 10 mol %;

(2) as measured with respect to a molded product having a thickness of 0.2 mm, the haze is at most 14%, or the total light transmittance is at least 90%;

(3) an ethylene-aromatic vinyl compound copolymer characterized in that the relation of the aromatic vinyl compound content and the glass transition point (Tg) obtained by an inflection point method as observed at a temperature of at least −50° C. by a differential scanning calorimeter (DSC), satisfies the following formula (1):

$$-20+1.00St>Tg>-30+1.05St \quad \text{Formula (1)}$$

wherein St represents the aromatic vinyl compound content (molar fraction %) in the copolymer; and (4) the weight average molecular weight is from 140,000 to 500,000 when the aromatic vinyl compound content is from 5 mol % to 10 mol % and from 60,000 to 500,000 when the content is from 0.5 mol % to less than 5 mol %.

(5) the stereoregularity of phenyl groups in the alternating structure of an aromatic vinyl compound and ethylene of the following formula (1) contained in the copolymer structure is such that the isotactic diad index m is larger than 0.55:

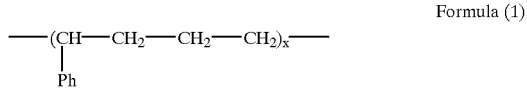

Formula (1)

(wherein Ph represents an aromatic group such as a phenyl group, and x represents the number of repeating units and is an integer of at least 2.)

The above copolymer of the present invention is preferably a copolymer obtainable by a catalyst which is capable of producing a polystyrene having an isotactic stereoregularity by homopolymerization of styrene. Further, preferably, the molecular weight distribution is at most 3.0, particularly preferably at most 2.5.

Further, the copolymer of the present invention preferably has the following composition:

(6) the aromatic vinyl compound content is from 3 mol % to 10 mol %;

(7) particularly preferably, the aromatic vinyl compound content is from 5 mol % to 10 mol %; and (8) the aromatic vinyl compound content is from 0.5 mol % to 5 mol %.

Further, the present inventors have conducted extensive studies to overcome the drawbacks of conventional molded products as described above, particularly transparent films, sheets, tubes, various packaging films, particularly stretch packaging films, or a transparent soft vinyl chloride resin, and as a result, have surprisingly found that an ethylene-aromatic vinyl compound copolymer having a specific composition, obtained by a specific polymerization catalyst, satisfies high transparency, mechanical properties, elastic recovery, cold resistance, touch feeling, processability and transparency all together. Further, it has been found that the ethylene type copolymer of the present invention is useful as a novel transparent resin, or in the form of a stretch packaging film, or further as a soft transparent resin to be substituted for a conventional transparent soft vinyl chloride resin or an olefin type elastomer, and the present invention has been accomplished.

Namely, the present invention is a molded product made of a copolymer having a composition wherein the aromatic vinyl compound content is from 3 mol % to 10 mol %, particularly preferably the aromatic vinyl compound content is from 5 mol % to 10 mol %. Preferably, it is a molded product which satisfies at least one of the following conditions, particularly preferably all of them:

(9) the breaking strength is at least 30 MPa, preferably at least 40 MPa;

(10) the initial tensile modulus is from 25 MPa to 70 MPa at room temperature (23° C.);

(11) the Shore A hardness is at least 90;

(12) the elastic recovery from 100% tensile strain at 23° C. is at least 70%;

(13) the loss tan δ at 0° C. of the dynamic viscoelasticity spectrum measured at a frequency of 10 Hz is from 0.05 to 0.7; and

(14) the heat of fusion of crystal obtained by DSC is at least 30 J/g.

Further, the present inventors have conducted extensive studies to overcome the above-mentioned drawbacks of conventional LLDPE and as a result, have surprisingly found that an ethylene type copolymer having a relatively low aromatic vinyl compound content (less than 5 mol %), obtained by a specific polymerization catalyst, satisfies a high melting point, a high mechanical property and transparency simultaneously. Further, they have found that the ethylene type copolymer of the present invention is useful as a novel transparent resin and as a soft resin to be substituted for conventional LLDPE, and thus have accomplished the invention.

Namely, the present invention is a molded product made of a copolymer having a composition wherein the aromatic vinyl compound content is at least 0.5 mol % and less than 5 mol %, particularly preferably at least 1 mol % and less than 5 mol %, preferably a molded product which satisfies at least one, particularly preferably all, of the following conditions:

(15) the melting point as measured by a differential scanning calorimeter (DSC) is from 100° C. to 130° C., and the heat of fusion of crystal is at least 60 J/g; and

(16) the initial tensile modulus is from 50 MPa to 200 MPa at room temperature (23° C.).

Now, the present invention will be described in detail.

Determination of the styrene content in the copolymer was carried out by 1H-NMR, and as instruments, α-500 manufactured by Nippon Denshi K.K. and AC-250 manufactured by BRUCKER COMPANY, were employed. It was carried out by comparison of intensities of the phenyl group proton-attributable peak (6.5 to 7.5 ppm) and the alkyl group-attributable proton peak (0.8 to 3 ppm) using TMS as a standard and employing a chloroform-d solvent or 1,1,2,2-tetrachloroethane-d2.

The transparency can be obtained as follows.

A test sample for evaluation of the transparency is molded by a heat pressing method (temperature: 180° C., time: 3 minutes, pressure: 50 kg/cm²) and then rapidly cooled to room temperature (23° C.) within 30 seconds to obtain a sheet having a thickness of 0.2 mm.

For the haze, this sheet is measured by a turbidity meter NDH-2000, manufactured by Nippon Denshoku K.K., in accordance with JIS-K-7361-1.

The copolymer of the present invention is considered to be capable of increasing the transparency particularly with a composition wherein the styrene content is from 0.5 mol % to 10 mol %, since the homogeneity of the copolymer is high, and/or the crystallite size attributable to the polyethylene structure can be reduced.

With the copolymer of the present invention, the glass transition point obtainable by a differential scanning calorimeter (DSC), will satisfy the following relational formula. Namely, the relation between the glass transition point (Tg) observed at a temperature of at least −50° C. and the aromatic vinyl compound content, satisfies the following formula (1):

$$-20+1.00St>Tg>-30+1.05St \quad \text{Formula (1)}$$

wherein St represents the styrene content (molar fraction %) in the copolymer. Further, here, Tg is a glass transition point obtainable by the inflection point method as illustrated in FIG. 1.

The copolymer having a higher glass transition point, as represented by this formula, shows a relatively high glass transition point, whereby the flexibility of the molded product or film tends to decrease at a low temperature such as a cold area temperature or a refrigerating temperature. Further, if the glass transition point is lower than the value represented by this formula, when a molded product or film, particularly a stretch packaging film, is to be used at a temperature around room temperature, the tan δ value (loss tangent) by a dynamic viscoelasticity measurement tends to be too low, thus leading to a drawback such that the touch feeling as a film or the appearance or touch feeling of the film packaged product tends to be poor. Further, when film packaging is carried out by an automatic packaging machine or the like, return against elongation is so quick that a phenomenon is likely to take place such that folding of the film at the bottom of the tray tends to be impaired, or the cutting property tends to deteriorate.

The glass transition point of the copolymer of the present invention as observed at a temperature of at least −50° C. by DSC, will satisfy the above formula. However, even at a temperature lower than the glass transition point, this copolymer will not be brittle although the flexibility and elongation may decrease. The embrittlement temperature of the copolymer of the present invention is not higher than −40° C., substantially not higher than −60° C. At the embrittlement temperature, the copolymer of the present invention and its molded product has cold resistance superior to a soft transparent polyvinyl chloride and cold resistance equal to a conventional transparent soft resin or LLDPE.

With respect to the molecular weight of the copolymer, the weight average molecular weight as calculated as a standard polystyrene was obtained by means of GPC (gel permeation chromatography). The measurement was made at 145° C. using orthodichlorobenzene as a solvent by means of HLC-8121 apparatus, manufactured by TOSOH CORPORATION.

The copolymer of the present invention has a weight average molecular weight of at least 140,000 when the aromatic vinyl compound content is from 5 mol % to 10 mol %. Further, the copolymer of the present invention has at least 60,000 when the aromatic vinyl compound content is at least 0.5 mol % and less than 5 mol %. If the molecular weights are lower than these weight average molecular weights, the mechanical properties such as breaking resistance and elongation will not be adequate, and even if the molecular weight distribution is changed, the fluidity tends to be high, and it tends to be difficult to apply a molding method such as inflation molding. Further, taking into consideration the moldability of the polymer, the weight average molecular weight of the copolymer of the present invention should properly be at most 50,000.

The DSC measurement was carried out by using DSC200, manufactured by Seiko Denshi K.K. 10 mg of a sample was heated from room temperature to 250° C. in a $N_2$ stream at a temperature raising rate of 20° C./min and held at 250° C. for 10 minutes, and then quenched with liquid nitrogen, and then heated from −100° C. to 280° C. at a temperature raising rate of 10° C./min, whereby the melting point, heat of fusion of crystal and glass transition point (Tg) were measured.

Further, the copolymer of the present invention is a copolymer wherein the stereoregularity of phenyl groups in the alternating structure of an aromatic vinyl compound and ethylene of the following formula (1) contained in the copolymer structure is such that the isotactic diad index m is larger than 0.55, preferably larger than 0.75, more preferably larger than 0.85, most preferably larger than 0.95:

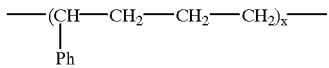

Formula (1)

(wherein Ph represents an aromatic group such as a phenyl group, and x represents the number of repeating units and is an integer of at least 2.)

In a case where the aromatic vinyl compound is styrene, the isotactic diad index m of the alternating copolymer structure of ethylene and styrene, can be obtained by the following formula (i) from an area Ar of the peak attributable to the r structure of the methylene carbon peak and an area Am of the peak attributable to the m structure appearing in the vicinity of 25 ppm:

$$m=Am/(Ar+Am) \quad \text{Formula (i)}$$

The positions of the peaks may sometimes shift more or less depending upon the measuring conditions or the solvent. For example, when chloroform-d is used as a solvent, and TMS is used as standard, the peak attributable to the r structure appears in the vicinity of from 25.4 to 25.5 ppm, and the peak attributable to the m structure appears in the vicinity of from 25.2 to 25.3 ppm.

Further, when tetrachloroethane-d2 is used as a solvent, and the center peak (73.89 ppm) of the triplet of tetrachloroethane-d2 is used as standard, the peak attributable to the r structure appears in the vicinity of from 25.3 to 25.4 ppm, and the peak attributable to the m structure appears in the vicinity of from 25.1 to 25.2 ppm.

Here, the m structure represents a meso diad structure, and the r structure represents a racemic diad structure. In the styrene-ethylene random copolymer of the present invention, the peak attributable to the r structure is not substantially observed in the alternating copolymer structure of ethylene and styrene.

Further, the aromatic vinyl compound-ethylene copolymer of the present invention preferably has a head-to-tail chain structure of two or more aromatic vinyl compounds which can be represented by the following structure:

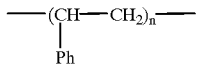

Formula (2)

Wherein n is an optional integer of at least 2, and Ph is an aromatic group such as a phenyl group.

Now, the aromatic vinyl compound-ethylene copolymer of the present invention will be described with reference to a styrene-ethylene copolymer as an example. However, the present invention is by no means restricted to a styrene-ethylene copolymer.

Namely, it is a styrene-ethylene copolymer which can have a chain structure of styrene attributable to peaks observed at from 40 to 45 ppm by the 13C-NMR measurement using TMS as standard, preferably a styrene-ethylene copolymer which can have a chain structure of styrene units attributable to peaks observed at from 42.3 to 43.1 ppm, from 43.7 to 44.5 ppm, from 40.5 to 41.0 ppm and from 43.0 to 43.6 ppm, or preferably a styrene-ethylene copolymer which can have a chain structure of styrene units attributable to peaks observed at from 42.3 to 43.1 ppm and from 43.7 to 44.5 ppm.

The styrene-ethylene random copolymer of the present invention is a copolymer comprising a chain structure having styrene units bonded head-to-tail, a chain structure having ethylene units bonded and a structure having styrene units and ethylene units bonded. The proportions of these structures contained in the copolymer vary depending upon the each content of styrene or the polymerization conditions such as the polymerization temperature. The proportions of these structures contained and the distribution of the structures are not restricted by a structural distribution by a specific statistical calculation.

If the styrene content is small, the proportion of the chain structure having styrene units bonded head-to-tail, decreases. For example, in the case of a copolymer having a styrene content of from about 10 to 20 mol %, it is difficult to directly observe a peak attributable to the chain structure having styrene units bonded head-to-tail by a usual 13C-NMR measurement. However, it is evident that by means of the transition metal catalyst component of the present invention or by the production method of the present invention, it is possible to produce a homopolymer having stereoregularity at a higher activity than polymerization of styrene alone, i.e. it is possible to form a chain structure having styrene units bonded substantially head-to-tail, and since in the copolymer, the proportion of the chain structure having styrene units bonded head-to-tail continuously changes in correspondence with the styrene content of from 20 to 99 mol % at least by the 13C-NMR method, the chain structure having styrene units bonded head-to-tail can be present in the copolymer although the amount may be small, even at a level of not more than 20 mol %.

Further, the copolymer of the present invention includes an aromatic vinyl compound-ethylene copolymer obtainable by means of a metallocene catalyst which is capable of producing a polystyrene having an isotactic stereoregularity by homopolymerization of styrene. The present invention includes an aromatic vinyl compound-ethylene copolymer having a molecular weight distribution (Mw/Mn) of at most 3.0, which is obtainable by means of a catalyst of this type.

Further, the styrene-ethylene copolymer of the present invention is preferably such that the stereoregularity of phenyl groups in the chain structure of styrene units, is isotactic. The stereoregularity of phenyl groups in the chain structure of styrene units being isotactic, is meant for a structure which shows an isotactic diad index ms (or a meso diad fraction) of more than 0.5, preferably at least 0.7, more preferably at least 0.8. The stereoregularity of the chain structure of styrene units can be determined by the peak position and the peak area intensity ratio of methylene carbon in the vicinity of from 43 to 44 ppm as observed by 13C-NMR, and/or by the peak position and the peak area intensity ratio of the main chain proton as observed by 1H-NMR.

Further, this copolymer may be represented as a transparent styrene-ethylene copolymer having a head-to-tail styrene chain structure, obtainable by means of a metallocene catalyst capable of producing an isotactic polystyrene by homopolymerization of styrene.

On the other hand, with a so-called pseudo random copolymer which has been known heretofore, a head-to-tail chain structure of styrene can not be found even when the styrene content is at the maximum of about 50 mol %. Further, even if homopolymerization of styrene is attempted by means of a catalyst for producing a pseudo random copolymer, no polymer will be obtained. Although there may be a case where a very small amount of an atactic styrene homopolymer is obtainable depending upon e.g. the polymerization conditions, this should be understood to have been formed by cation polymerization or radical polymerization by co-existing methyl almoxane or an alkyl aluminum contained therein.

Depending upon the polymerization conditions or the like, there may be a case where such an atactic polystyrene homopolymer will be contained in the copolymer of the present invention, but its amount is small and usually at most 5 to 10 wt %, and the copolymer may be used as it is so long as its physical properties, particularly transparency, will not depart from the gist of the present invention. Further, such an atactic polystyrene homopolymer can readily be separated and removed by e.g. solvent fractionation.

It is known that peaks of methylene carbon of a structure attributable to an inversion bond of styrene in a conventional pseudo random copolymer having no stereoregularity, are observed in two regions of from 34.0 to 34.5 ppm and from 34.5 to 35.2 ppm (e.g. Polymer Preprints, Japan, 42, 2292 (1993)).

The styrene-ethylene copolymer of the present invention may have a similar structure. In this case, a peak attributable to methylene carbon of an inversion bond structure derived from styrene is observed in a region of from 34.5 to 35.2 ppm, but no substantial peak is observed in a region of from 34.0 to 34.5 ppm. This indicates one of the features of the copolymer of the present invention and indicates that high stereoregularity of phenyl groups is maintained even in an inversion bond structure as shown by the following formula, which is derived from styrene.

Formula (3)

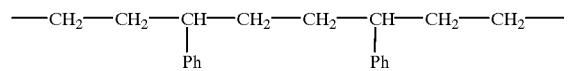

Further, the copolymer of the present invention is preferably a copolymer wherein the alternating structure index λ of the copolymer given by the following formula (ii) is smaller than 5 and larger than 0.1.

$\lambda = A3/A2 \times 100$  Formula (ii)

Wherein A3 is the sum of areas of three peaks a, b, and c attributable to a styrene-ethylene alternating structure represented by the following formula (1'), obtained by the 13C-NMR measurement, and A2 is the sum of areas of peaks attributable to the main chain methylene and methine carbon, as observed within a range of from 0 to 50 ppm by 13C-NMR using TMS as standard.

Formula (1')

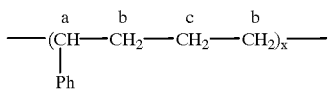

The styrene-ethylene copolymer of the present invention has a characteristic such that it has an alternating structure of ethylene and styrene having high stereoregularity and at the same time has various structures such as ethylene chains having various lengths, inversion bonds of styrene and styrene chains having various lengths simultaneously. Further, the styrene-ethylene copolymer of the present invention has a characteristic such that the proportion of the alternating structure can be variously changeable by the content of styrene in the copolymer within such a range that the value λ obtained by the above formula is more than 0.1 and not more than 10, preferably more than 0.1 and not more than 5.

As compared with a conventional styrene-ethylene copolymer having no stereoregularity or no styrene chain, the copolymer of the present invention exhibits improved performance in e.g. the initial tensile modulus of elasticity, hardness, breaking strength and solvent resistance in each region of the St content and at various degrees of crystallinity, and it shows characteristic physical properties as a novel portion or as a low crystalline resin, a thermoplastic elastomer or a transparent soft resin.

This styrene-ethylene copolymer itself which does not basically contain an exudative plasticizer or halogen, has a basic feature that the safety is high.

The copolymer of the present invention is useful as a substitute for a transparent soft vinyl chloride resin, or an olefinic plastomer or elastomer, as the initial modulus of elasticity of the copolymer has a high value of from 25 MPa to 70 MPa at a styrene content of from 3 mol % to 10 mol %, particularly preferably from 5 mol % to 10 mol %. If the styrene content is higher than 10 mol %, the tensile modulus of elasticity tends to be lower than 25 MPa, whereby it tends to be too soft, and the rubber elasticity tends to be too high, and such is not suitable for such an application. Further, if it is lower than 3 mol % or 5 mol %, the elastic recovery tends to be too low, and the tensile modulus of elasticity tends to be too high, such being also not suitable for such an application.

The ethylene type copolymer of the present invention is considered to have a high melting point, transparency and mechanical properties especially with a composition having a styrene content of at least 0.5 mol % and less than 5 mol %, since the uniformity of the copolymer is high and/or it is possible to control the crystallite size while maintaining the crystallizability attributable to the polyethylene structure.

Further, it is considered that the copolymer of the present invention has a highly isotactic stereoregularity in the alternating structure of styrene and ethylene and in the chain structure of styrene and styrene, or readily takes an alternating structure of styrene-ethylene-styrene also in a low styrene content region, whereby a dense polyethylene crystal structure can easily be formed, thereby to give controlled high crystallizability to the polyethylene structure and/or to the polyethylene structure containing styrene units. Therefore, a copolymer having a composition wherein the styrene content is at least 0.5 mol % and less than 5 mol %, can be suitably used as a novel transparent soft resin as a substitute for LLDPE or an olefin type plastomer.

In the foregoing, the present invention has been described with respect to a styrene-ethylene copolymer, but the copolymer of the present invention is not limited thereto.

The aromatic vinyl compound to be used in the present invention may, for example, be styrene and various substituted styrenes such as p-methylstyrene, m-methylstyrene, o-methylstyrene, o-t-butylstyrene, m-t-butylstyrene, p-t-butylstyrene, p-chlorostyrene, o-chlorostyrene and α-methylstyrene. Further, a compound having a plurality of vinyl groups in one molecule, such as divinyl benzene, may, for example, be mentioned. Industrially preferably employed is styrene, p-methylstyrene or p-chlorostyrene, particularly preferably styrene.

Further, to the copolymer of the present invention, an olefin, or a conjugated or non-conjugated diene may be incorporated as a third component. The olefin may, for example, be a $C_{3-20}$ α-olefin, such as propylene, 1-butene, 1-hexene, 4-methyl-1-pentene, 1-octane or a cyclic olefin such as cyclopentene or norbornene. Preferably, propylene is employed. The conjugated or non-conjugated diene may, for example, be butadiene, isoprene or 1,4-hexadiene, 1,5-hexadiene, ethylidene norbornene or dicyclopentadiene, norbornadiene, 4-vinyl-1-cyclohexane, 3-vinyl-1-cyclohexane, 2-vinyl-1-cyclohexane, 1-vinyl-1-cyclohexane, the above-mentioned divinyl benzene, particularly preferably various vinyl cyclohexanes or divinyl benzene. Such non-conjugated dienes are employed to introduce cross linking points without impairing the basic physical properties of the aromatic vinyl compound-olefin copolymer, preferably the aromatic vinyl compound-ethylene copolymer, as the base of the present invention. Accordingly, the amount to be copolymerized is preferably as small as possible within a range where a practical cross linking point density can be obtained. Preferably, it is from 0.01 to 5 mol %, more preferably from 0.01 to 2 mol %, most preferably from 0.01 to 1 mol %.

When an olefin other than ethylene is used for the present copolymer, a styrene-ethylene-propylene copolymer, a styrene-ethylene-1-hexene copolymer or a styrene-ethylene-1-octene copolymer is, for example, preferred.

Method for Producing an Ethylene-aromatic Vinyl Compound Copolymer to Be Used in the Present Invention The ethylene-aromatic vinyl compound copolymer to be used in the present invention is not particularly limited by the method for its synthesis so long as it has the above-mentioned composition and properties. However, preferably, it is obtained by copolymerizing an aromatic vinyl compound monomer and ethylene monomer in the presence of a coordination polymerization catalyst. As the coordination polymerization catalyst to be employed, a soluble Ziegler-Natta catalyst, a transition metal compound catalyst (so-called metallocene catalyst or half metallocene catalyst, CGCT catalyst or the like) activated by e.g. methyl aluminoxane or a boron compound.

Specifically, the polymerization catalyst disclosed in the following literatures and patents can be employed.

Metallocene catalysts are disclosed in U.S. Pat. No. 5,324,800, WO98/09999, JP-A-7-73488, JP-6-49132, Polymer Preprints, Japan, 42,2292 (1993), Macromol. Chem., Rapid Commun., 17,745 (1996), JP-A-9-309925 and EP-0872492A.

Half metallocene catalysts are disclosed in Makromol. Chem. 191,2387 (1990).

CGCT catalysts are disclosed in JP-A-3-163088, JP-A-7-53618, and EP-A-416815.

Soluble Ziegler-Natta catalysts are disclosed in JP-A-3-250007 and Stud. Surf. Sci. Catal., 517 (1990).

Preferably, the present copolymer can be synthesized from an aromatic vinyl compound and an olefin monomer by a polymerization catalyst comprising a bridged metallocene compound and a cocatalyst.

As the bridged metallocene compound to be used, a metallocene compound represented by the following Formula (4) is preferably employed:

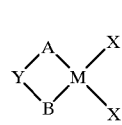

Formula (4)

wherein A and B are groups selected from unsubstituted or substituted cyclopentaphenanthryl groups (Ka 10, 11), unsubstituted or substituted benzoindenyl groups (Ka 12–14), unsubstituted or substituted cyclopentadienyl groups (Ka 15), unsubstituted or substituted indenyl groups (Ka 16) and unsubstituted or substituted fluorenyl groups (Ka 17), provided at least one of A and B is a group selected from unsubstituted or substituted cyclopentaphenanthryl groups and unsubstituted or substituted benzoindenyl groups. Preferably, at least one of A and B is a group selected from unsubstituted or substituted benzoindenyl groups. Also in a case where A and B are cyclopentaphenanthryl groups simultaneously, the weight average molecular weight is relatively low when the aromatic vinyl compound (styrene) content is at most 10 mol %, whereby it is difficult to satisfy the conditions for the copolymer of the present invention.

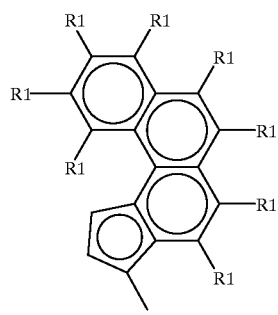

Ka 10

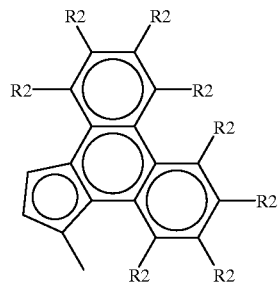

Ka 11

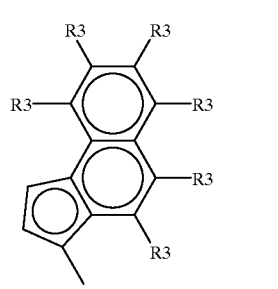

Ka 12

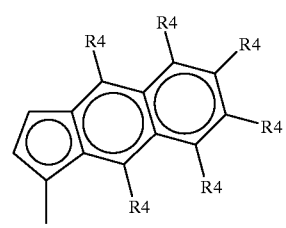

Ka 13

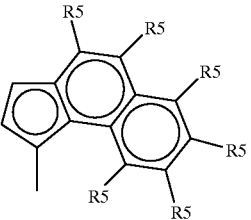

Ka 14

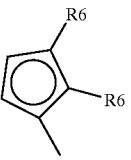

Ka 15

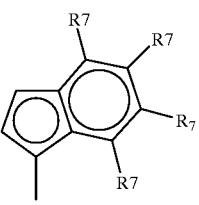

Ka 16

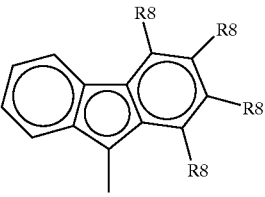

Ka 17

(In the above Ka 10–17, each of $R^1$ to $R^8$ groups is hydrogen, a $C_{1-20}$ alkyl group, a $C_{6-10}$ aryl group, a $C_{7-20}$ alkylaryl group, a halogen atom, a $OSiR^3$ group, a $SiR^3$ group or a $PR_2$ group (wherein each R is a $C_{1-10}$ hydrocarbon group), and plurality of $R^1$, $R^2$, $R^3$, $R^4$, $R^5$, $R^6$, $R^7$ or $R^8$, may, respectively, be the same or different.

When A and B are unsubstituted or substituted benzoindenyl groups, they may be the same or different.

The unsubstituted cyclopentaphenanthryl group, may specifically be a 3-cyclopenta[c]phenanthryl group or a 1-cyclopenta[1]phenanthryl group.

The unsubstituted benzoindenyl group, may, for example, be 4,5-benzo-1-indenyl (another name: benzo(e)indenyl), 5,6-benzo-1-indenyl or 6,7-benzo-1-indenyl, and the substituted benzoindenyl group may, for example, be an α-acenaphtho-1-indenyl group.

The unsubstituted cyclopentadienyl group may be cyclopentadienyl, and the substituted cyclopentadienyl group may, for example, be 4-aryl-1-cyclopentadienyl, 4,5-diaryl-1-cyclopentadienyl, 5-alkyl-4-aryl-1-cyclopentadienyl, 4-alkyl-5-aryl-1-cyclopentadienyl, 4,5-dialkyl-1-cyclopentadienyl, 5-trialkylsilyl-4-alkyl-1-cyclopentadienyl, or 4,5-dialkylsilyl-1-cyclopentadienyl.

The unsubstituted indenyl group may be 1-indenyl, and the substituted indenyl group may, for example, be 4-alkyl-1-indenyl, 4-aryl-1-indenyl, 4,5-dialkyl-1-indenyl, 4,6-dialkyl-1-indenyl, 5,6-dialkyl-1-indenyl, 4,5-diaryl-1-indenyl, 5-aryl-1-indenyl, 4-aryl-5-alkyl-1-indenyl, 2,6- dialkyl-4-aryl-1-indenyl, 5,6-diaryl-1-indenyl, or 4,5,6-triaryl-1-indenyl.

The unsubstituted fluorenyl group may be a 9-fluorenyl group, and the substituted fluorenyl group may, for example, be a 7-methyl-9-fluorenyl group or a benzo-9-fluorenyl group.

In the above Formula (4), Y is carbon or silicon having bonds to A and B and having other substituents, or a methylene group having hydrogen or a $C_{1-15}$ hydrocarbon group. The substituents may be the same or different from one another. Further, Y may have a cyclic structure such as a cyclohexylidene group or a cyclopentylidene group.

Preferably, Y is a substituted methylene group having bonds to A and B and substituted by hydrogen or a $C_{1-15}$ hydrocarbon group. The hydrocarbon group may, for example, be an alkyl group, an aryl group, a cycloalkyl group or a cycloaryl group. The substituents may be the same or different from one another.

Particularly preferably, Y is, for example, —CH$_2$—, —CMe$_2$—, —CEt$_2$—, —CPh$_2$—, a cyclohexylidene or cyclopentylidene group. Here, Me represents a methyl group, Et represents an ethyl group, and Ph represents a phenyl group.

X is hydrogen, halogen, a $C_{1-15}$ alkyl group, a $C_{6-10}$ aryl group, a $C_{8-12}$ alkyl aryl group, a silyl group having a $C_{1-4}$ hydrocarbon substituent, a $C_{1-10}$ alkoxy group, or a dialkylamide group having a $C_{1-6}$ alkyl substituent. The halogen may, for example, be chlorine or bromine, the alkyl group may, for example, be a methyl group or an ethyl group, the aryl group may, for example, be a phenyl group, the alkylaryl group may, for example, be a benzyl group, the silyl group may, for example, be a trimethylsilyl group, the alkoxy group may, for example, be a methoxy group, an ethoxy group or an isopropyl group, and the dialkylamide group may, for example, be a dimethylamide group.

M is zirconium, hafnium or titanium, particularly preferably zirconium.

As the complex, when a raceme and a meso form exist, the raceme is preferably employed. However, a mixture of the raceme and the meso form, or the meso form may be employed. Further, a d-isomer or a l-isomer may be employed.

Further, as the complex, when a pseudo raceme and a pseudo meso form exist, the pseudo raceme is preferably employed. However, a mixture of the pseudo raceme and the pseudo meso form, or the pseudo meso form may be employed.

The following compounds may be mentioned as examples of such a transition metal catalyst component.

For example, dimethylmethylene(4,5-benzo-1-indenyl)(3-cyclopenta[c]phenanthryl)zirconium dichloride, dimethylmethylene(5,6-benzo-1-indenyl)(3-cyclopenta[c]phenanthryl)zirconium dichloride, dimethylmethylene(6,7-benzo-1-indenyl)(3-cyclopenta[c]phenanthryl)zirconium dichloride, dimethylmethylene(4,5-benzo-1-indenyl)(1-cyclopenta[1]phenanthryl)zirconium dichloride, dimethylethylene(5,6-benzo-1-indenyl)(1-cyclopenta[1]phenanthryl)zirconium dichloride, dimethylmethylene(6,7-benzo-1-indenyl)(1-cyclopenta[1]phenanthryl)zirconium dichloride, dimethylmethylenebis(4,5-benzo-1-indenyl)zirconium dichloride {another name: dimethylmethylenebis(benzo[e]indenyl)zirconium dichloride}, di-n-propylmethylenebis(4,5-benzo-1-indenyl)zirconium dichloride, di-i-propylmethylenebis(4,5-benzo-1-indenyl)zirconium chloride, cyclohexylidenebis(4,5-benzo-1-indenyl)zirconium dichloride, cyclopentylidenebis(4,5-benzo-1-indenyl)zirconium dichloride, diphenylmethylenebis(4,5-benzo-1-indenyl)zirconium dichloride, dimethylmethylene(cyclopentadienyl)(4,5-benzo-1-indenyl)zirconium dichloride, dimethylmethylene(1-indenyl)(4,5-benzo-1-indenyl)zirconium dichloride, dimethylmethylene(1-fluorenyl)(4,5-benzo-1-indenyl) zirconium dichloride, dimethylmethylene(4-phenyl-1-indenyl)(4,5-benzo-1-indenyl)zirconium dichloride, dimethylmethylene(4-naphtyl-1-indenyl)(4,5-benzo-1-indenyl)zirconium dichloride, dimethylmethylenebis(5,6-benzo-1-indenyl)zirconium dichloride, dimethylmethylene(5,6-benzo-1-indenyl)(1-indenyl)zirconium dichloride, dimethylmethylenebis(6,7-benzo-1-indenyl)zirconium dichloride, dimethylmethylene(6,7-benzo-1-indenyl)(1-indenyl)zirconium dichloride, dimethylmethylenebis(α-acenaphtho-1-indenyl)zirconium dichloride, dimethylmethylenebis(4,5-benzo-1-indenyl)zirconiumbis(dimethylamide) and dimethylmethylene(1-indenyl)(4,5-benzo-1-indenyl)zirconiumbis(dimethylamide) may be mentioned.

Especially, the following compounds may be mentioned as examples of a transition metal catalyst component wherein A is a group selected from unsubstituted or substituted benzoindenyl groups, and B is a group selected from substituted cyclopentaphenanthryl groups, unsubstituted or substituted indenyl groups and unsubstituted or substituted fluorenyl groups.

Dimethylmethylene(1-indenyl)(4,5-benzo-1-indenyl)zirconium dichloride, dimethylmethylene(1-fluorenyl)(4,5-benzo-1-indenyl)zirconium dichloride, dimethylmethylene(3-cyclopenta[c]phenanthryl)(4,5-benzo-1-indenyl) zirconium dichloride, dimethylmethylene(1-cyclopenta[1]phenanthryl)(4,5-benzo-1-indenyl)zirconium dichloride, dimethylmethylene(1-indenyl)(4,5-benzo-1-indenyl)zirconiumbis(dimethylamide), and diphenylmethylene(1-indenyl)(4,5-benzo-1 -indenyl)zirconium dichloride.

In the foregoing, zirconium complexes are exemplified, but similar compounds as the above may suitably be employed with respect to the titanium and hafnium complexes. Further, a mixture of a raceme and a meso form may be employed. Preferably, a raceme or a pseudo raceme is employed. In such cases, D-isomers or L-isomers may be employed.

As the co-catalyst to be employed in the present invention, a co-catalyst which is used in combination with a transition metal catalyst component in the known literatures, may be employed. As such a co-catalyst, aluminoxane (or alumoxane) or a boron compound, as disclosed in JP-A-9-309925 or EP-872492, may suitably be employed.

Such a boron compound and the above-mentioned organic aluminum compound may be used simultaneously.

For the production of the copolymer of the present invention, ethylene and an aromatic vinyl compound are contacted with a transition metal catalyst component as a metal complex and a co-catalyst. With respect to the order of contact and the contacting method, an optional known method may be employed.

For the production of the aromatic vinyl compound polymer of the present invention, the above exemplified aromatic vinyl compound, the transition metal catalyst component as a metal complex and the co-catalyst are contacted. With respect to the order of contact and the contacting method, an optional known method may be employed.

The above copolymerization method may be a method wherein polymerization is carried out in a liquid monomer without using a solvent, or a method wherein a saturated aliphatic or aromatic hydrocarbon or a halogenated hydrocarbon, such as pentane, hexane, heptane, cyclohexane, benzene, toluene, ethylbenzene, xylene, chloro-substituted benzene, chloro-substituted toluene, methylene chloride or chloroform, is used alone or in the form of a mixed solvent. Further, as the case requires, a method such as batch polymerization, continuous polymerization, batch type polymerization, slurry polymerization, preliminary polymerization or gas phase polymerization, may be employed.

Heretofore, when styrene is employed as a monomer component, it used to be impossible to adopt gas phase polymerization, since the vapor pressure is low. However, when the catalyst for polymerization of the present invention comprising the transition metal catalyst component and the co-catalyst, is employed, the copolymerization ability of styrene is very high, and copolymerization is possible even at a low styrene monomer concentration. Namely, copolymerization of an olefin with ethylene is possible even under a low styrene partial pressure under a gas phase polymerization condition. In such a case, the transition metal catalyst component for polymerization and the cocatalyst may be employed as supported on a suitable known carrier.

The polymerization temperature is suitably from −78° C. to 200° C. A polymerization temperature lower than −78° C. is industrially disadvantageous, and if it exceeds 200° C., decomposition of the metal complex is likely to take place, such being undesirable. Industrially more preferably, it is from 0° C. to 160° C., particularly preferably from 30° C. to 160° C. The pressure during the copolymerization is suitably from 0.1 atm to 100 atm, preferably from 1 to 30 atm, particularly industrially preferably, from 1 to 10 atm.

When an organic aluminum compound is used as a cocatalyst, it is used in an aluminum atom/complex metal atomic ratio of from 0.1 to 100,000, preferably from 10 to 10,000, to the metal of the complex. If it is smaller than 0.1, the metal complex can not be activated, and if it exceeds 100,000, such is economically disadvantageous.

When a boron compound is employed as a cocatalyst, it is used in a boron atom/complex metal atom ratio of from 0.01 to 100, preferably from 0.1 to 10, particularly preferably 1.

If it is less than 0.01, the metal complex can not effectively be activated, and if it exceeds 100, such is economically disadvantageous.

The metal complex and the cocatalyst may be mixed and prepared outside the polymerization tank, or may be mixed in the tank at the time of polymerization. Further, a known chain transfer agent such as hydrogen may be added at the time of polymerization to control the molecular weight of the copolymer.

Molded Product Made of the Polymer of the Present Invention

Now, the molded product made of the copolymer of the present invention will be described.

The copolymer of the present invention can be molded by an optional known molding method which is commonly employed for other ethylene type resins. As an example of the molding method, a known molding method such as vacuum molding, injection molding, blow molding, inflation molding or extrusion molding, may be employed.

The copolymer of the present invention can be molded and used in various forms such as a film, a sheet, a tube and a package. The film or the sheet usually has a thickness of at most 3 mm and at least 10 $\mu$m. Especially, the film has a thickness of at most 1 mm and at least 10 $\mu$m, preferably at most 200 $\mu$m and at least 10 $\mu$m. The present film or sheet can be prepared by an optional molding method or production method known to those skilled in the art.

Further, the film of the present invention can be obtained by blending other polymer, elastomer, rubber or the like, as the case requires, or it may be laminated with other films to form a multilayer structure.

Likewise, a stabilizer, an aging-preventing agent, a light resistance improving agent, an ultraviolet absorber, a plasticizer, a softening agent, a lubricant, a processing adjuvant, a colorant, an antistatic agent, an anti-fogging agent, a blocking-preventing agent, a crystal nucleating agent, etc. may be incorporated as the case requires. These additives may be used alone or in combination of a plurality of them.

The ethylene-styrene copolymer to be suitably employed in the present invention, is excellent in transparency. Accordingly, when such a copolymer is used alone as the main constituting units, it is possible to obtain a film having excellent transparency. Specifically, a case may be mentioned wherein the ethylene-styrene copolymer of the present invention is preferably at least 5 wt %, more preferably at least 50 wt %, particularly preferably at least 98 wt %.

Whereas, in the case of film containing the ethylene-styrene copolymer of the present invention as a composition, there is a method of blending it with a resin, an elastomer, a rubber or an additive which has characteristics such that the refractive index value is close, and it is excellent in transparency. In such a case, the difference in the refractive index between the two is preferably at most 0.2, more preferably at most 0.05, particularly preferably at most 0.02. Further, in such a case, the transparency can further be improved if the difference in the compatibility parameter value is within a certain level. Specifically, it is preferably at most 5 (cal/cm$^3$)1/2, more preferably at most 3 (cal/cm$^3$)1/2, particularly preferably at most 1 (cal/cm$^3$) 1/2.

The refractive indices and the compatibility parameter values of the resin, the elastomer, the rubber, the additive, etc. to be blended, are known as disclosed, for example, in Polymer Handbook, third edition, published by WILEY INTERSCIENCE COMPANY.

Further, also when the resin, the elastomer, the rubber, the additive, etc. are dispersed in fine particles, preferably at a level of at most 0.5 $\mu$m, more preferably at most 0.2 $\mu$m, particularly preferably at most 0.05 $\mu$m, it is possible to obtain a film having excellent transparency.

Further, in order to improve the physical properties of the molded product of the copolymer of the present invention, an olefin-styrene copolymer having an optional styrene content or having a different molecular weight may be incorporated in an optional amount to obtain a composition. In such a case, the olefin may be ethylene or other α-olefin.

Further, in order to improve the physical properties, the copolymer of the present invention may be employed as a composition with other resin.

The polymer which can be blended, is not particularly limited. However, an olefin type resin such as isotactic polypropylene, syndiotactic polypropylene, atactic polypropylene, straight chain low density polyethylene (L-LDPE), low density polyethylene (LDPE), a block or random copolymer of ethylene or propylene with an α-olefin such as butene, hexane or octane, polymethylpentene, polybutene-1, an ethylene-acrylate copolymer, an ethylene-methacrylate copolymer or an ethylene-vinyl acetate copolymer, an ionomer resin, or a styrene type resin such as polystyrene, a styrene-methacrylate copolymer, or a styrene-acrylonitrile copolymer, may, for example, be mentioned.

The elastomer and the rubber which can be blended, are not particularly limited. However, a styrene-butadiene block copolymer (SBS) and its hydrogenated product (SEBS), a styrene-butadiene rubber (SBR) and its hydrogenated product, butadiene rubber (BR), a styrene-isoburene block copolymer (SIS) and its hydrogenated product (SEPS), and a styrene-butadiene-methylmethacrylate copolymer (MBS) may, for example, be mentioned.

To the above-mentioned ethylene-aromatic vinyl compound copolymer of the present invention or its composition, an additive such as a softening agent, a heat stabilizer, an antistatic agent, a weather resistance agent, an antioxidant, a filler, a colorant, a lubricant or an antifogging agent, may be incorporated as the case requires within a range not to impair the purpose of the present invention. As the filler, specifically, calcium carbonate, talc, clay, calcium silicate, magnesium carbonate or magnesium hydroxide may, for example, be mentioned.

Further, as a softening agent which can be incorporated as the case requires, in order to adjust the hardness or flowability of the product, various types such as a paraffin type, naphthene type or aroma type process oil, a mineral oil type softening agent such as liquid paraffin, castor oil and linceed oil, may specifically be employed. The amount of such a softening agent is usually preferably from 0 to 150 parts by weight, per 100 parts by weight of the copolymer.

The molded product of a copolymer having a composition wherein the aromatic vinyl compound content is at least 3 mol % and less than 10 mol %, preferably the aromatic vinyl compound content is at least 5 mol % and at most 10 mol %, among the copolymers of the present invention, preferably satisfies at least one, particularly preferably all, of the following conditions:

(9) the breaking strength is at least 30 MPa, preferably at least 40 MPa;

(10) the initial tensile modulus is from 25 MPa to 70 MPa at room temperature (23° C.);

(11) the Shore A hardness is at least 90;

(12) the elastic recovery from 100% tensile strain at −23° C. is at least 70%;

(13) the loss tan δ at 0° C. of the dynamic viscoelasticity spectrum measured at a frequency of 10 Hz is from 0.05 to 0.7; and

(14) the heat of fusion of crystal obtained by DSC is at least 30 J/g.

Namely, it is useful as a molded product of a novel transparent resin, such as a film, sheet, tube or package, especially as a stretch packaging film, and further as a soft transparent resin to be substituted for conventional transparent soft vinyl chloride resin or an olefinic elastomer, in order to satisfy high transparency, mechanical properties (breaking strength, tensile modulus of elasticity), elastic recovery, hardness, cold resistance, touch feeling, processability and transparency simultaneously.

Required Properties as a Film

The relation of the initial modulus of elasticity (tensile modulus of elasticity) and the styrene content (mol %) of the ethylene-styrene copolymer to be used in the present invention, is from 25 MPa to 70 MPa at a content of at least 3 and less than 10%, from 30 MPa to 70 MPa at a content of at least 5 and less than 15%, and from 30 MPa to 70 MPa at a particularly preferred content of at least 5 to less than 10%, such being suitable for a film, particularly for a stretch packaging film. The characteristics and physical properties as a film, depend largely on the initial tensile modulus of elasticity (hereinafter referred to simply as the initial modulus) of the polymer to be used.

In the present invention, the initial tensile modulus of elasticity represents the modulus of elasticity at an elongation of 0% on a stress-strain curve by a tensile test, and represents a Young's modulus in a low strain region (a linear elasticity region) in accordance with the Hooke's law on the stress-strain curve by the tensile test. A specific measuring method is disclosed, for example, in JIS K7113. For example, a film employing a polymer having an initial modulus of lower than 25 MPa, is elastic and easily be elongated, or has little tension against stress, whereby it has problems from the viewpoint of working efficiency such that it gives an unreliable impression when used for stretch packaging, and its cutting property is so poor that it is not suitable for an automatic packaging machine.

On the other hand, in the case of a film obtainable from a polymer having a initial modulus exceeding 70 MPa, such as a LLDPE film or a multilayer film containing it, it is hardly stretched, and when used for stretch packaging, an excess stress will be exerted to the packaged product, whereby the packaged product is likely to be deformed, crushed or wrinkled, such being undesirable. Therefore, when a film is employed for stretch packaging, the initial modulus of the polymer to be used is preferably within a certain predetermined range. Although it depends also on the particular application, a proper range of the initial modulus of the polymer to be used, is from 25 MPa to 70 MPa, preferably from 30 MPa to 70 MPa, particularly preferably from 30 MPa to 60 MPa, at 23° C.

In general, the initial modulus of a film will be improved by a stretching operation. Accordingly, in order to measure the initial modulus of the material itself, it is necessary to carry out the measurement of the initial modulus with respect to a film in a substantially non-stretched state, obtainable by press molding or extrusion molding involving no stretching. Especially when the film of the present invention is employed as a stretch packaging film, it is necessary to employ a polymer having, in addition to the above initial modulus, a proper elastic recovery from elongation i.e. a low elongation set. A film employing a material having a low elastic recovery such as a linear low density polyethylene (LLDPE), has problems such that the tension of the packaging film lowers and sagging will result due to e.g. a stress exerted during the storage or display of the packaged commercial product, or impressions due to finger pressing during the display, will remain to impair the outer appearance (finger pressure recovery being low).

Therefore, a film employing an ethylene-styrene copolymer having an elastic recovery of preferably at least 70%, particularly preferably at least 75%, is suitable as a packaging stretch film. (The method for measuring the elastic recovery is disclosed in Examples.)

The ethylene-styrene copolymer of the present invention wherein the styrene content is at least 3 and at most 10%, preferably at least 5 and less than 10%, by molar fraction, exhibits a high elastic recovery of at least 70%, particularly at least 75% and thus can be suitably used for a stretch packaging film.

Further, especially, the packaging film may sometimes be used at a low temperature and is preferably excellent in low temperature characteristic. Accordingly, the copolymer is required to be a copolymer whereby the relation of the aromatic vinyl compound content (St) and the glass transition point (Tg) observed at a temperature of at least −50° C. by a differential scanning calorimeter (DSC) will satisfy the Formula (1):

$$-20+1.00St > Tg > -30+1.05St \qquad \text{Formula (1)}$$

wherein St represents the aromatic vinyl compound monomer content represented by mol %.

In the case of a copolymer having a glass transition point higher than the one shown by this formula, the glass transition point is relatively high, whereby the film tends to be too hard at a low temperature such as a chilled storage temperature (5° C.) or a refrigerating temperature. Further, if the glass transition point is lower than the value represented by this formula, when the film, particularly the stretch packaging film, is used at about room temperature, the tan δ-value (loss tangent) by the measurement of the dynamic viscoelasticity tends to be too low, thus leading to a drawback that the touch as a film, the outer appearance of the film packaged product and the feel are poor. Further, when it is used for packaging by an automatic packaging machine or the like, the return against elongation is so quick that, for example, the holding back of the film at the bottom of the tray tends to be impaired, or the cutting property tends to deteriorate. Here, the glass transition point is a glass transition point obtainable by an inflection point method by the DSC measurement.

Further, so long as the glass transition points observed at a temperature of at least −50° C. all satisfy the above conditions, the copolymer of the present invention may have at least one other glass transition point at a temperature lower than −50° C.

Further, with the ethylene-styrene copolymer to be used in the present invention, the loss tan δ at 0° C. of the dynamic viscoelasticity spectrum measured at a frequency of 10 Hz is from 0.05 to 0.7, preferably from 0.1 to 0.6, more preferably from 0.2 to 0.5. If tan δ at 0° C. is less than 0.05, when the copolymer is made into a film, the low temperature characteristic tends to be inadequate, such that the elastic characteristic at a low temperature tends to be too strong. Further, if it exceeds 0.8, wrinkling, sagging or the like of the package tends to result during the storage at a low temperature, and the finger pressure recovery tends to be low, and thus the low temperature characteristic of the film tends to be likewise inadequate.

The film made of the copolymer of the present invention can be made to be a film which has a draw ratio of from 1.2 to 50 times at least in one direction. Here, the draw ratio means a draw ratio in hot drawing, to which a molten resin composition is subjected at a die opening of an extrusion molding machine while being cooled and solidified. For example, it includes a blow-up ratio (the maximum diameter of a bubble/the slit diameter of the die) in an inflation system and a drawdown ratio (the linear velocity of the first cooling roll outer diameter/the resin flow rate at the die opening) of a T-die system. Further, at least in one direction usually means one direction among the film flow direction and the direction perpendicular thereto, in extrusion molding. A preferred range of the blow-up ratio is from 1.2 to 10 times, a preferred range of the drawdown ratio is from 5 to 50 times.

It is apparent that high transparency is required for a transparent film or a transparent stretch packaging film. If the transparency is low, it tends to be difficult to ascertain the content of the packaged product, whereby the convenience and the appearance will be impaired. The film made of the copolymer of the present invention may have a haze of at most 1.5% in a thickness of from 3 µm to 100 µm.

The molded product of the present invention, particularly the film or the stretch packaging film, may be subjected to surface treatment such as corona, ozone or plasma treatment, coating of an anti-fogging agent, coating of a lubricant, printing or the like.

Among molded products of the present invention, the film or the stretch packaging film, can be prepared as a stretched film subjected to monoaxial or biaxial stretching orientation, as the case requires.

Films or stretch packaging films of the present invention may be bonded to one another or to materials of other thermoplastic resins, by fusion by means of heat, ultrasonic or high frequency waves or by a technique such as bonding by means of e.g. a solvent.

Further, when it is used as a stretch packaging film for foods, packaging can be suitably conducted by an automatic packaging machine or by a manual packaging machine.

For the production of a transparent film or a stretch packaging film of the present invention, a usual extrusion film forming method such as an inflation system or a T-die system, may be employed.

The thickness of the film or the stretch packaging film of the present invention is not particularly limited, but it is usually from 3 µm to 1 mm, preferably from 10 µm to 0.5 mm. To use it as a stretch packaging film for foods, the thickness is preferably from 5 to 100 µm, more preferably from 10 to 50 µm.

For the purpose of improving the physical properties, the film or the stretch packaging film of the present invention may be laminated with a film of e.g. isotactic or syndiotactic polypropylene, high density polyethylene, low density polyethylene (LDPE or LLDPE), polystyrene or polyethylene terephthalate.

Further, the film or the stretch packaging film of the present invention has self-tackiness, since the contained ethylene-styrene copolymer itself has self-tackiness or adhesiveness to some extent. In a case where a stronger self-tackiness is required, it may be laminated with other film having self-tackiness to obtain a multilayered film.

Further, when a stretch packaging film having a non-tacky surface and a tacky surface on the front and rear sides, is desired, other non-tacky surface may be made of an ethylene-styrene copolymer having a higher ethylene content or a linear low density polyethylene having a density of at least 0.916 g/cm$^3$ in a thickness of from 5 to 30% of the total thickness, the interlayer may be made of the ethylene-styrene copolymer to be used in the present invention, and the tacky layer may be made of one having from 2 to 10 wt % of liquid polyisobutylene, liquid polybutadiene or the like incorporated to the ethylene-styrene copolymer to be used in the present invention, one having from 2 to 10 wt % of liquid polyisobutylene, liquid polybutadiene or the like incorporated to a linear low density polyethylene having a density of at least 0.916 g/cm$^3$, or an ethylene/vinyl acetate copolymer, in a thickness of from 5 to 30% of the total thickness, to obtain a multilayer film. Otherwise, it is also possible to incorporate a suitable tackifier in a suitable amount.

Specific applications of the film of the present invention are not particularly limited, but it is useful as a general packaging material or a container and can be used for e.g. a packaging film, a bag or a pouch. Especially, it can suitably be used as a stretch packaging film or a pallet stretching film for food packaging.

Further, when the film of the present invention has a thickness of, for example, at least 100 µm, a packaging tray for foods, electrical products, etc., can be molded by a technique such as heat molding such as vacuum molding, compression molding or air-pressure forming.

The copolymer of the present invention or its composition is very useful also as a substitute for a soft vinyl chloride resin from the viewpoint of its transparency and high mechanical properties.

Use as a Substitute for LLDPE or Olefin Type Plastomer

A molded product made of a copolymer having a composition with an aromatic vinyl compound content of at least 0.5 mol % and less than 5 mol %, particularly preferably at least 1 mol % and less than 5 mol %, among the copolymers of the present invention, is a molded product satisfying preferably at least one, particularly preferably all, of the following conditions, whereby, it is possible to satisfy a high melting point, high mechanical properties and transparency at the same time, and as a novel transparent resin, it is useful as a soft resin to be substituted for conventional LLDPE or an olefin type plastomer:

(15) the melting point as measured by a differential scanning calorimeter (DSC) is from 100° C. to 130° C., and the heat of fusion of crystal is at least 60 J/g; and

(16) the initial tensile modulus is from 50 MPa to 200 MPa at room temperature (23° C.).

By the present invention, it is possible to provide a transparent aromatic vinyl ethylene copolymer excellent in the mechanical properties, transparency, low temperature characteristics and moldability, and its molded product (such as a film, sheet or tube).

BEST MODE FOR CARRYING OUT THE INVENTION

Figure 1:
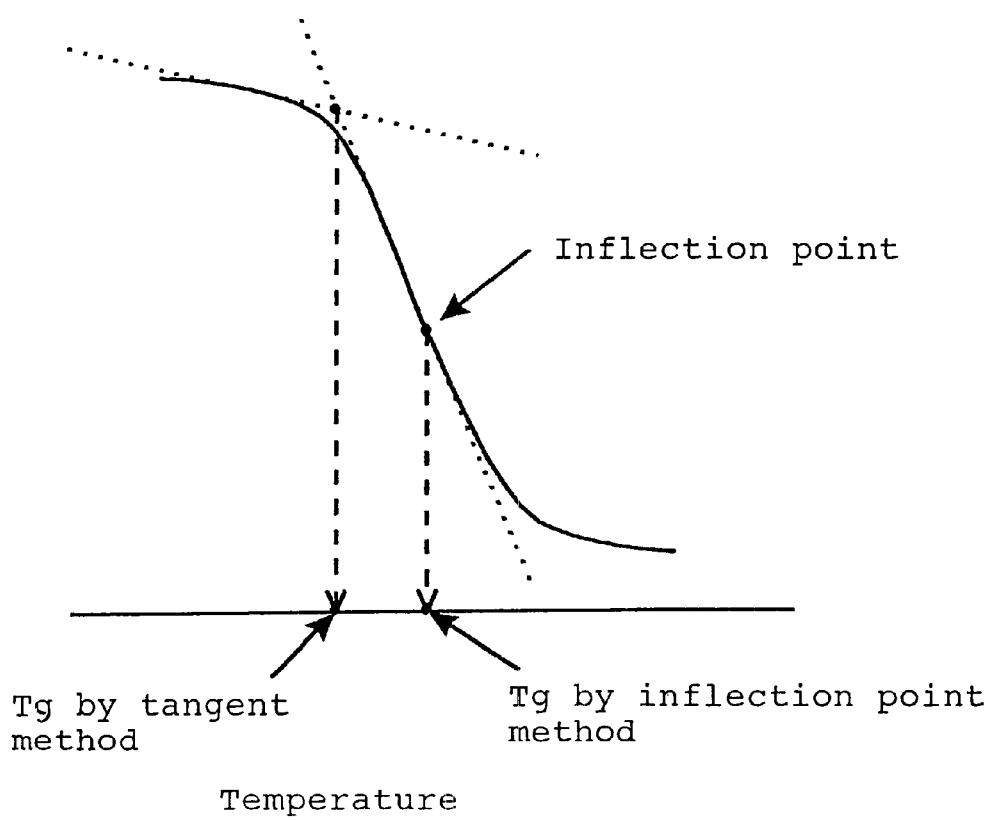
FIG. 1 shows the methods for measuring the glass transition point (Tg) (Tangent intersection method and inflection point method).

Now, the present invention will be described with reference to Examples. But the present invention is by no means restricted to the following Examples.

In the following description, Cp represents a cyclopentadienyl group, Ind a 1-indenyl group, BzInd a 4,5-benzo-1-indenyl group, CpPhen a 3-cyclopenta[C]phenanthryl group, Flu a 9-fluorenyl group, Me a methyl group, Et an ethyl group, tBu a tertiary butyl group, and Ph a phenyl group.

The analyses of copolymers obtained in the respective Examples and Comparative Examples were carried out by the following methods.

The 13C-NMR spectrum was measured by using TMS as standard, by using a chloroform-d solvent or a 1,1,2,2-tetrachloroethane-d2 solvent, by means of α-500 manufactured by Nippon Denshi Kabushiki Kaisha. Here, the measurement using TMS as standard is the following measurement. Firstly, using TMS as standard, the shift value of the center peak of triplet 13C-NMR peaks of 1,1,2,2-tetrachloroethane-d2 was determined. Then, the copolymer was dissolved in 1,1,2,2-tetrachloroethane-d2, and the 13C-NMR was measured, whereby each peak shift value was calculated, based on the triplet center peak of 1,1,2,2-tetrachloroethane-d2. The shift value of the triplet center peak of 1,1,2,2-tetrachloroethane-d2 was 73.89 ppm.

The 13C-NMR spectrum measurement for quantitive analysis of peak areas, was carried out by a proton gate decoupling method having NOE erased, by using pulses with a pulse width of 45° and a repeating time of 5 seconds as standard.

When the measurement was carried out under the same conditions except that the repeating time was changed to 1.5 seconds, the measured values of peak areas of the copolymer agreed to the values obtained in the case where the repeating time was 5 seconds, within measurement error.

The styrene content in the copolymer was determined by 1H-NMR. As the apparatus, α-500 manufactured by Nippon Denshi Kabushiki Kaisha and AC-250 manufactured by BRUCKER COMPANY, were employed. The determination was carried out by comparing the intensity of the proton peak attributable to a phenyl group (6.5 to 7.5 ppm) and the proton peak attributable to an alkyl group (0.8 to 3 ppm), measured by using TMS as standard and a chloroform-d solvent or 1,1,2,2-tetrachloroethane-d2.

As the molecular weights in Examples, weight average molecular weights as calculated as standard polystyrene, were obtained by means of GPC (Gel Permeation Chromatography).

As the molecular weights of the copolymers, weight average molecular weights as calculated as standard polystyrene, were obtained by GPC (Gel Permeation Chromatography). The measurement was carried out at 145° C. by using o-dichlorobenzene as a solvent by means of HLC-8121 apparatus, manufactured by TOSOH CORPORATION, or at 135° C., by using 1,2,4-trichlorobenzene as a solvent by means of GPC-7100, manufactured by Senshu Kagaku Kabushiki Kaisha, or by using 1,2,4-trichlorobenzene as a solvent, by means of 150CV apparatus, manufactured by Waters Company.

The DSC measurement was carried out by using DSC 200 manufactured by Seiko Denshi K.K. in a nitrogen stream at a temperature raising rate of 10° C./min. A sample (10 mg) was once heated to 250° C. and maintained for a few minutes, and then rapidly cooled at a rate of at least 2° C./min by liquid nitrogen. Then, the temperature was raised at a rate of 10° C./min from −100° C., whereby the glass transition point and the melting point were determined. The heat of fusion of crystal was obtained from the crystal fusion peak area observed at a temperature of at least 60° C.

Further, as a sample for evaluation of the transparency, a film having a thickness of 0.2 mm or 1.0 mm was employed which was formed by pressing under the conditions of heat pressing method (temperature: 180° C., time: 3 minutes, pressure: 50 kg/cm$^2$G) of a heat pressing method, followed by cooling to room temperature (23° C.) within 30 seconds). The haze and the total light transmittance were measured by using this sheet in accordance with JIS K-7361-1 by means of a turbidity meter NDH-2000, manufactured by Nippon Denshoku K.K.

The physical property test of the molded product, the film-formation and the evaluation of the physical properties of the obtained film, were carried out by the following methods.

Press Molding and Tensile Test

By a heat press method (temperature: 180° C., time: 3 minutes, pressure: 50 kg/cm$^2$G), a film (sheet) having a thickness of 1.0 mm was prepared and used. In accordance with JIS K-7113, it was punched out in a shape of the JIS No. 2 small size (½) test specimen, followed by measurement at a tensile speed of 100 mm/min using a tensile tester of Tensilone RTM-1T model. The tensile modulus (initial modulus) was obtained from the inclination of the tangent line at an elongation of 0% on the stress-strain curve by the tensile test.

The elastic recovery was obtained as follows. Using the JIS No. 2 small size (½) test specimen, it was pulled by a tensile tester to a strain of 100% with a distance between chucks being 20 mm (L0) and maintained for 10 minutes, whereupon the stress was released (without repulsion), and the length after one minute was represented by (L), whereupon the elastic recovery was obtained by the following formula.

$$\text{Elastic recovery} = \{1-(L-L0)/L0\} \times 100$$

Vicat Softening Point

A sheet having a thickness of 4 mm was prepared by a heat pressing method, and a test specimen of 10 mm×10 mm was cut out. In accordance with JIS K-7206, it was measured under a load of 320 g at an initial temperature of 40° C. under a temperature raising condition of 50° C./hr using HDT & VSPT tester S3-FH, manufactured by Toyo Seiki.

Measurement of Dynamic Viscoelasticity

Using a dynamic viscoelasticity measuring apparatus (SOLIDS ANALYZER RSA-II), manufactured by Reometric Scientific Company), the loss tangent δ was measured at a frequency of 10 Hz in a temperature range of from −70° C. to +70° C. at a temperature raising rate of 5° C./min with a strain of 0.5%. As a sample, one in a film shape with a distance between chucks of 22.6 mm×a width of 3 mm×a thickness of 30 μm, was used.

Stretch Film Forming

Using a laboplasto mill (manufactured by Toyo Seiki K.K.) of extruder type (cylinder diameter: 20 mm, L/D=21), stretch film-forming was carried out (film width=100 mm) at a cylinder temperature of from 120 to 210° C. at a die temperature of from 150 to 210° C. at a screw rotational speed of 80 rpm using a screw of a shallow flight Dulmage head type (CR=2.9), a feed/compression/metering (full-flight+double flighted Dulmage)=7D/5D/9D and a die of coathanger type (width: 150 mm, lip opening: 0.3 mmt).

Tensile Test of a Stretch Film Sample

In accordance with JIS K-6251, the film was cut into a No. 1 test piece shape, and using a tensile tester of AGS-100D model, manufactured by Shimadzu Corporation, the measurement was carried out at a tensile speed of 500 mm/min.

Finger Pressure Recovery Test of a Stretch Film

The finger recovery of a film was determined by stretching the film by 10% in a width direction and then pushing a rod having a radius of curvature of 12.5 mm at its forward end against the film surface having a diameter of 45 mm, whereby the depth at the limit in recovery within one minute was obtained. The test was repeated five times, and represented by a range of the maximum value and the minimum value (the minimum value to the maximum value).

Packaging Machine Aptitude of a Stretch Film

Using a stretch packaging film obtained by film forming, the packaging machine aptitude was evaluated by means of an automatic packaging machine.

Low Temperature Characteristics of a Stretch Film

A content was wrapped with a stretch packaging film obtained by film forming and stored at 5° C. for 24 hours, whereupon the tensional state of the packaging film as its appearance, the presence or absence of formation of wrinkles, sagging or the like and the recovery after pressing the film for from 5 to 10 mm with a finger, were evaluated as a whole. One which is susceptible to wrinkles, sagging or the like when touched with a hand and which shows low recovery after pressed with a finger, was designated by X.

EXAMPLE 1

Preparation of a Copolymer

Using rac-dimethylmethylenebis(4,5-benzo-1-indenyl) zirconium dichloride as a transition metal compound, the preparation was carried out under the conditions as shown in Table 1 as follows.

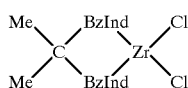

Polymerization was carried out by means of a polymerizer having a capacity of 150 l and equipped with a stirrer and a jacket for heating and cooling.

69 l of dehydrated cyclohexane and 3 l of dehydrated styrene were charged and heated and stirred at an internal temperature of about 50° C. 84 mmol of triisobutyl aluminum and 84 mmol, based on Al, of methylalmoxane (PMAO, manufactured by Toso Akuzo Company) were added. Ethylene was immediately introduced, and after the pressure was stabilized at 1.0 MPa (9 kg/cm$^2$G), from the catalyst tank installed above the polymerizer, 100 ml of a toluene solution having 84 μmol of rac-dimethylmethylenebis(4,5-benzo-1-indenyl)zirconium dichloride, the catalyst obtained by the above-mentioned preparation A of a transition metal catalyst component, and 2 mmol of triisobutyl aluminum dissolved therein, was added to the polymerizer. Immediately, heat generation started, and therefore, cooling water was introduced to the jacket. The internal temperature increased to 58° C., but thereafter, polymerization was carried out for 2.0 hours while maintaining the internal temperature at about 50° C. and the pressure at 1.0 MPa.

After completion of the polymerization, the obtained polymerization reaction solution was deaerated and then treated by the following crumb-forming method to recover the polymer.

The polymerization reaction solution was introduced over a period of one hour into 300 l of heated water of 85° C. containing a vigorously stirred dispersant (PULRONIC, trade name). Thereafter, stirring was continued at 97° C. for one hour, and then the hot water containing the crumb was put into cool water to recover the crumb. The crumb was dried in air at 50° C. and then vacuum-deaerated at 60° C. to obtain about 7 kg of a polymer having a good crumb shape having a size of about a few mm.

Further, a part of the polymerization reaction solution was withdrawn as it was from the polymerizer and introduced gradually into vigorously stirred excess methanol to let the formed polymer precipitate. It was dried under reduced pressure at 80° C. until no more weight change was observed. The polymer recovered in this manner was press-molded, and the haze was measured.

EXAMPLE 2

Preparation of a Copolymer

Using rac-dimethylmethylenebis(4,5-benzo-1-indenyl) zirconium dichloride as a transition metal compound, the preparation was carried out under the conditions as identified in Table 1.

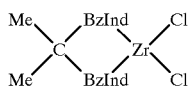

EXAMPLE 3

Preparation of a Copolymer

Using rac-dimethylmethylenebis(4,5-benzo-1-indenyl) zirconium dichloride as a transition metal compound, the preparation was carried out as follows under the conditions as identified in Table 1.

Polymerization was carried out by means of an autoclave having a capacity of 10 l and equipped with a stirrer and a jacket for heating and cooling.

4,600 ml of dehydrated toluene and 200 ml of dehydrated styrene were charged, and heated and stirred at an internal temperature of 70° C. About 100 l of nitrogen was bubbled to purge the interior of the system, and 8.4 mmol of triisobutyl aluminum and 8.4 mmol, based on Al, of methylalmoxane (PMAO, manufactured by Toso Akzo Company) were added. Ethylene was immediately introduced, and after stabilizing the pressure at 1.1 MPa (10 kg/cm$^2$G), from a catalyst tank installed above the autoclave, about 50 ml of a toluene solution having 8.4 μm of the transition metal compound and 0.84 mmol of triisobutyl aluminum dissolved therein, was added to the autoclave. Due to rapid polymerization, the internal temperature increased to the maximum of 98° C. instantaneously, and the ethylene pressure decreased to the minimum of 0.5 MPa, but thereafter, polymerization was carried out for 0.5 hour while maintaining the internal temperature at about 80° C. and the pressure at 1.1 MPa. After completion of the polymerization, the obtained polymerization reaction solution was introduced gradually into vigorously stirred excess methanol to let the formed polymer precipitate. It was dried under reduced pressure at 80° C. until no more weight change was observed, to obtain 450 g of the polymer.

EXAMPLES 4 to 6

Preparation of Copolymers

Using rac-dimethylmethylenebis(4,5-benzo-1-indenyl) zirconium dichloride as a transition metal compound, the preparation was carried out in the same manner as in Example 3 under the conditions as shown in Table 1.

Comparative Examples 1 to 5

Preparation of Copolymers

With reference to literatures, the following transition metal compounds were prepared, and the preparation was carried out in the same manner as in Example 1 or 3, under the conditions as shown in Table 1.

TABLE 1

| Examples | Catalyst | Amount of catalyst (μmol) | Co-catalyst (μmol) MAO | Amount of solvent | Amount of styrene | Ethylene pressure MPa | Polymerization temperature (° C.) | Polymerization time (hr) | Yield | Si content (mol %) (%) |
|---|---|---|---|---|---|---|---|---|---|---|
| Example 1 | A | 84 | P 84 | Cy69 l | 3 l | 1.0 | 48–58 | 2.0 | 7.0 kg | 8.8 |
| Example 2 | A | 87 | P 84 | Cy69 l | 3 l | 1.0 | 60 | 2.7 | 6.5 kg | 5.1 |
| Example 3 | A | 8.4 | P 8.4 | T4600 ml | 200 ml | 1.1–0.5 | 70–98 | 0.5 | 450 g | 3.0 |
| Example 4 | A | 1.3 | P 8.4 | T4600 ml | 200 ml | 1.1 | 70 | 2.0 | 430 g | 2.4 |
| Example 5 | A | 4.2 | P 8.4 | T4500 ml | 300 ml | 1.1 | 70–80 | 0.8 | 450 g | 4.7 |
| Example 6 | A | 4.2 | P 4.2 | C4400 ml | 400 ml | 1.1 | 50 | 3.0 | 674 g | 9.5 |
| Comparative Example 1 | B | 267 | P 840 | Cy60 l | 12 l | 1.0 | 46–52 | 3.0 | 5.0 kg | 9.3 |
| Comparative Example 2 | B | 12.6 | M 84 | T4000 ml | 800 ml | 1.1 | 70 | 3.0 | 189 g | 5.0 |
| Comparative Example 3 | B | 84 | M 84 | T4000 ml | 800 ml | 1.1 | 90 | 1.0 | 332 g | 7.8 |
| Comparative Example 4 | C | 84 | M 84 | T 800 ml | 4000 ml | 0.2 | 50 | 6.0 | 386 g | 9.5 |
| Comparative Example 5 | A | 2.1 | M 84 | T4000 ml | 800 ml | 1.1 | 50 | 4.0 | 874 g | 15.5 |

P: P—MAO, M: M—MAO, T: Toluene, Cy: Cyclohexane

In the above table, A to C are as follows.

A: rac-isopropylidenebis(4,5-benzo-1-indenyl)zirconium dichloride

B: CGCT (constrained geometric structure) type Ti complex (tertiary butyl amide) dimethyl(tetramethyl-η5-cyclopentadienyl)silane titanium dichloride C: rac-ethylenebis(1-indenyl)zirconium dichloride In Table 2 on the next page, the compositions of the obtained polymers and the molecular weights obtained by GPC, and the results of the glass transition points and the melting points obtained by DSC, are shown.

TABLE 2

| Examples and Comparative Examples | St content (mol %) | Mw/10⁴ | Mw/Mn | Glass transition temperature (° C.) *1 | Glass transition temperature (° C.) *2 | Melting point (° C.) | Heat of fusion of crystal J/g |
|---|---|---|---|---|---|---|---|
| Example 1 | 8.8 | 18.9 | 2.0 | −25 | −16 | 93 | 42 |
| Example 2 | 5.1 | 20.4 | 2.0 | −24 | −20 | 102 | 72 |
| Example 3 | 3.0 | 9.5 | 1.7 |  | −22 | 116 | 105 |
| Example 4 | 2.4 | 10.8 | 1.5 |  | −23 | 117 | 108 |
| Example 5 | 4.7 | 14.2 | 1.8 |  | −22 | 108 | 67 |
| Example 6 | 9.5 | 17.2 | 2.1 | −26 | −15 | 80 | 40 |
| Comparative Example 1 | 9.3 | 19.2 | 2.0 | −22 | −14 | 80 | 36 |
| Comparative Example 2 | 5.0 | 36.3 | 1.7 | −22 | −15 | 107 | Not measured |
| Comparative Example 3 | 7.8 | — | — | −27 | −17 | 85,112 | Not measured |
| Comparative Example 4 | 9.5 | 5.0 | 2.0 | −27 | −20 | 73,112 | Not measured |
| Comparative Example 5 | 15.5 | 12.0 | 1.5 | −24 | −13 | 83,60 | Not measured |

*1 By a tangent intersection method, or an onset method (Polymer handbook third edition P VI/210, FIG. 2).
*2 By an infection point method. Obtained from the inflection point on the DSC curve.

The obtained peak was a single peak, and in the GPC measurements of the polymer obtained in each Example, the GPC curves obtained by different detectors (RI and UV) agreed within a range of experimental error. This indicates that the present copolymer is an extremely homogeneous copolymer with little compositional distribution.

Further, the copolymer of the present invention has a weight average molecular weight of from 140,000 to 500,000 when the aromatic vinyl compound content is from 5 mol % to 10 mol %, and from 60,000 to 500,000 when the aromatic vinyl compound content is at least 0.5 mol % and less than 5 mol %, and thus it has excellent mechanical properties and moldability.

With the copolymer of the present invention, the relation between the aromatic vinyl compound content and the glass transition point (Tg) obtained by an inflection point method as observed at a temperature of at least −50° C. by differential scanning calorimeter (DSC), satisfies the following formula (1):

$$-20 + 1.00 St > Tg > -30 + 1.05 St$$

wherein St represents the styrene content (molar fraction %) in the copolymer.

A styrene-ethylene copolymer as an example of the transparent aromatic vinyl compound-ethylene copolymer of the present invention, is specifically a copolymer which may contain typical structures of the following formulae in optional proportions.

The 13C-NMR spectrum shows peaks attributable to the following in the methine and methylene carbon regions. Symbols a to o are symbols showing the carbons shown in the following chemical structure. Using the center peak (73.89 ppm) of the triplet of tetrachloroethane-d as standard, peaks attributable to the following are shown.

(1) Alternating structure of styrene and ethylene

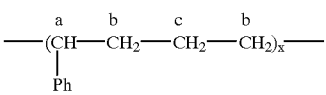

Formula (1')

(wherein Ph represents a phenyl group, and x represents an integer of at least 2 as the number of repeating units.)
Namely, it represents a structure shown by the following formula comprising methine carbons connected to Ph groups and three methylene carbons sandwiched therebetween:

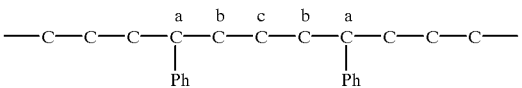

(For simplification, hydrogen atoms were omitted.)
(2) Chain structure of ethylene

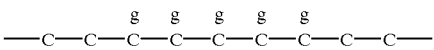

(3) Structure comprising an ethylene chain and one unit of styrene

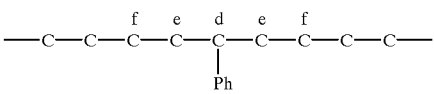

(4) Structure comprising inversion of styrene units (tail-to-tail structure)

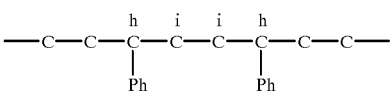

(5) Structure comprising ethylene units or ethylene chains and two styrene units in a head-to-tail chain

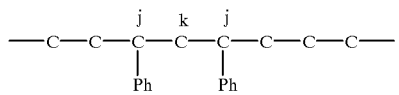

or a structure wherein styrene units and styrene-ethylene alternating structure units are randomly bonded Styrene unit:

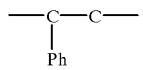

Alternating structure unit:

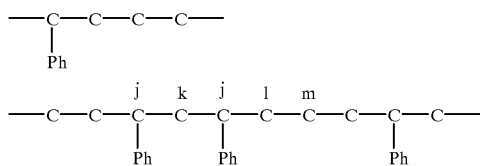

(6) Structure comprising at least three styrene units in a head-to-tail chain

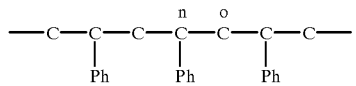

The foregoing peaks may undergo certain shifts or formation of microstructures of peaks or peak shoulders depending upon the measuring conditions, the influences of e.g. a solvent or far distance effects from adjacent structures.

Attribution of these peaks was made by peak shift prediction based on Macromolecules, vol. 13, 849 (1980), Stuf. Surf. Sci. Catal., 517, 1990, J. Appl. Polymer Sci., vol. 53, 1453 (1994), J.Polymer Phys. Ed., vol. 13, 901 (1975), Macromolecules, vol. 10, 773 (1977), European Patent 416815, JP-A-4-130114, 13C-NMR Inadequate method, DEPT method, and 13C-NMR database STN (Specinfo).

With respect to the copolymer obtained in each Example, the structural index $\lambda$, and the isotactic diad index m of the silane unit-ethylene unit alternating structure were obtained by the above-mentioned formulae (i) and (ii), respectively. They are shown in Table 3.

TABLE 3

| Examples and Comparative Examples | St content (mol %) | Value $\lambda$ | Value m |
|---|---|---|---|
| Example 1 | 8.8 | 5 | >0.95 |
| Example 2 | 5.1 | 2 | >0.95 |
| Example 3 | 3.0 | 1 | >0.95 |
| Example 4 | 2.4 | 1 | >0.95 |
| Example 5 | 4.7 | 2 | >0.95 |
| Example 6 | 9.5 | 5 | >0.95 |
| Comparative Example 1 | 9.3 | — | 0.5 |
| Comparative Example 2 | 5.0 | — | 0.5 |
| Comparative Example 3 | 7.8 | — | 0.5 |
| Comparative Example 4 | 9.5 | — | 0.5 |
| Comparative Example 5 | 15.5 | 8 | >0.95 |

— Not measured

With respect to the copolymer obtained in each Example or Comparative Example, the mechanical properties obtained from the S-S curve, the total light transmittance and the haze value are shown in Table 4 on next page. It is evident that each of the copolymers of the present invention has high mechanical properties and high transparency (high total light transmittance and low haze value).

TABLE 4

| | Elongation (%) | Breaking strength (MPa) | Tensile modulus (MPa) | Total light transmittance (%) | | Haze (%) | |
|---|---|---|---|---|---|---|---|
| | | | | 1 mm | 0.2 mm | 1 mm | 0.2 mm |
| Example 1 | 540 | 37 | 34 | 86.2 | 90.6 | 13.2 | 3.9 |
| Example 2 | 680 | 44 | 65 | 82.2 | 90.6 | 33.0 | 6.2 |
| Example 3 | 700 | 30 | 114 | Not measured | 91.6 | Not measured | 7.4 |
| Example 4 | 810 | 24 | 131 | Not measured | 90.1 | Not measured | 13.2 |
| Example 5 | 710 | 39 | 60 | Not measured | 92.4 | Not measured | 3.8 |
| Example 6 | 650 | 46 | 27 | 91.8 | 93.0 | 5.6 | 4.0 |
| Comparative Example 1 | 490 | 39 | 18 | Not measured | 87.4 | 58.2 | 22.4 |
| Comparative Example 2 | 580 | 42 | 95 | Not measured | 88.1 | Not measured | 19.3 |
| Comparative Example 3 | Not measured | Not measured | Not measured | Not measured | 89.8 | 49.6 | 22.6 |
| Comparative Example 4 | 550 | 8 | 10 | Not measured | Not measured | 89.5 | 87.7 |
| Comparative Example 5 | 400 | 41 | 9.2 | 85.0 | 92.0 | 7.5 | 3.7 |

Further, the copolymer of the present invention has extremely high transparency with a haze of not higher than 14% as measured with respect to a molded product having a thickness of 0.2 mm and with a total light transmittance of at least 90%.

The loss tangent value (tan δ) obtained from the viscoelasticity spectrum, the elastic recovery and the Shore's A hardness are shown in Tables 5, 6 and 7, respectively.

TABLE 5

|  | Loss tangent (tan δ) |
|---|---|
| Example 1 | 0.27 |

TABLE 6

|  | Elastic recovery |
|---|---|
| Example 1 | 85% |
| Example 2 | 75% |

TABLE 7

|  | Shore's A hardness |
|---|---|
| Example 1 | 94 |
| Example 2 | 96 |
| Comparative Example 3 | 89 |

Further, a molded product made of a copolymer of the present invention, particularly a molded product made of a copolymer having an aromatic vinyl compound (styrene) content of from 5 mol % to 10 mol %, satisfies the following conditions.

The breaking strength is at least 30 MPa, preferably at least 40 MPa.

The initial tensile modulus is at least 25 MPa to 70 MPa at room temperature (23° C.).

The Shore's A hardness is at least 90.

The elastic recovery from 100% tensile strain at 23° C., is at least 70%.

The loss tangent (tan δ) at 0° C. of the dynamic viscoelasticity spectrum measured at a frequency of 10 Hz, is from 0.05 to 0.7.

Further, the heat of fusion of crystal obtained by DSC, was at least 30 J/g with every one of the polymers of Examples.

Accordingly, the molded product made of this copolymer is useful for an application as a soft transparent resin, a transparent plastomer or elastomer or as a substitute for a transparent soft vinyl chloride resin.

Further, a molded product made of the copolymer of the present invention, particularly a molded product made of a copolymer having an aromatic vinyl compound (styrene) content of at least 0.5 mol % and less than 5 mol %, satisfies the following conditions:

The melting point by a differential scanning calorimeter (DSC) is from 100° C. to 130° C. Further, the heat of fusion of crystal is at least 60 J/g.

The initial tensile modulus is from 50 MPa to 200 MPa at room temperature (23° C.).

Accordingly, the molded product made of the copolymer of the present invention is particularly useful for application as a substitute for a soft transparent resin such as LLDPE or an olefin type plastomer, in view of high transparency and high heat resistance as well as high mechanical strength (tensile modulus). Further, it has an economical merit that it is not necessary to use an expensive α-olefin such as 1-octene.

The physical properties were compared with an olefin type plastomer or LLDPE having a melting point similar to a copolymer film of a composition having an aromatic vinyl compound content of less than 5 mol % among the copolymer films of the present invention.

The physical properties of an ethylene-1-octene copolymer, Afinity FM1570 and Afinity PL1880, manufactured by Dow Company, are shown (Table 13).

As compared with a copolymer having substantially the same melting point, the copolymer of the present invention has a high tensile modulus. Further, it is evident that it has equivalent transparency and elongation.

The copolymers obtained in Example 1 and a Comparative Example were made into films by the above-mentioned method and evaluated. The results are shown in Tables 8 and 9 on the next page. Further, for the purpose of comparison, a vinyl chloride type stretch film (DENKA WRAP SHINSEN, manufactured by Denki Kagaku Kogyo K.K.), a polyethylene type stretch film (DENKA NICE WRAP, manufactured by Denki Kagaku Kogyo K.K.) and a copolymer having a styrene content of 20 mol % (prepared by the catalyst used in the Examples) were evaluated and shown together.

TABLE 8

Physical properties of stretch film molded products

| Polymer | Breaking strength (MPa) | | Elongation (%) | | Finger pressure recovery (mm) 1) | Thickness (μm) | Haze (%) | Total light transmittance (%) |
|---|---|---|---|---|---|---|---|---|
|  | Longitudinal | Transverse | Longitudinal | Transverse |  |  |  |  |
| Example 1 | 43.2 | 25.2 | 240 | 560 | 15 to 19 | 32 | 2.10 | 92.0 |
| Vinyl chloride film | 24 | 14 | 160 | 220 | 18 to 20 | 13 | 0.6 | 92.4 |
| PE type film | 21 | 30 | 440 | 460 | 11 to 12 | 15 | 0.5 | 92.7 |

Note: The "longitudinal" and "transverse" represent the extruded direction of the film and the direction perpendicular thereto, respectively. 10% or 25% modulus was measured in the longitudinal direction.
1) The minimum value to the maximum value

TABLE 9

| Polymer | Self-tackiness | Film-forming property | Packaging efficiency | Low temperature characteristics |
|---|---|---|---|---|
| Example 1 | Self-tackiness observed | Easy. Good forming stability | Good. | ○ |
| Comparative Example 1) | High self-tackiness | Poor. High self-tackiness. Molded by means of a release film. | Poor as rubbery and stickiness being high. | × |

Comparative Example 1

An Ethylene-styrene Copolymer Having a Styrene Content of 20 mol %

The ethylene-styrene random copolymer film according to the present invention, has a proper initial modulus similar to a vinyl chloride film, high strength, excellent elastic recovery (low elongation set), a proper glass transition point and high transparency, and thus it is useful particularly as a stretch or shrink-stretch film.

The copolymer of the present invention is excellent in the low temperature characteristics. As shown in the following Table 10, each of the copolymers obtained in Examples shows a brittle temperature of not higher than −60° C. (in accordance with JIS K-6723, K-7216)

TABLE 10

| | Cold resistance (Brittle temperature) |
|---|---|
| Example 1 | Not higher than −60° C. |
| Example 2 | Not higher than −60° C. |
| Example 3 | Not higher than −60° C. |
| Example 4 | Not higher than −60° C. |
| Example 5 | Not higher than −60° C. |
| Example 6 | Not higher than −60° C. |
| DENKA VINYCON S2100-50 | −29° C. |
| ENGAGE | Not higher than −60° C. |

This is superior to a vinyl chloride compound having substantially the same touch, as a Comparative product and is a value equal to a polyolefin type plastomer (ethylene-1-octene copolymer: ENGAGE8452).

EXAMPLE 7

Preparation of a Homopolymer of Styrene

Using a catalyst (a transition metal compound) shown in the following Table 11 as a transition metal compound, polymerization was carried out at room temperature. (styrene: 10 ml, toluene: 20 ml, MAO: 8.4 mmol).

TABLE 11

| Catalyst and catalyst amount | Yield | Molecular weight (Mw) | Molecular weight distribution (Mw/Mn) | Melting point | Stereoregularity a) |
|---|---|---|---|---|---|
| A, 1.5 μmol | 1.5 g | 36,000 | 1.9 | 220 | mmmm > 0.90 |

TABLE 12

| | Methine carbon | Methylene carbon | Phenyl C1 carbon |
|---|---|---|---|
| Example 7 | 40.7 | 43.0 | 146.3 |

In a globe box, 10 ml of styrene, 1 mmol of TIBA and 8.4 mmol of M-MAO were charged into a glass container (equipped with a magnetic stirrer). Into this solution, 16 ml of toluene containing each amount of the transition metal compound, was added, followed by stirring at room temperature for 3 hours. The polymerization reaction solution was gradually put into a large excess amount of methanol acidified with hydrochloric acid to let the formed polymer precipitate, to obtain the polymer.

As a result of the 13C-NMR, DSC and XRD measurements, the respective polymers were confirmed to be all isotactic polystyrenes. (see the above Table 12).

TABLE 13

| Polymer | Elongation (%) | Breaking strength (MPa) | Tensile modulus (MPa) | Haze (%) | Total light transmittance (%) | DSC melting point (° C.) |
|---|---|---|---|---|---|---|
| Affinity FM1570 | 710 | 38 | 86 | 8.6 | 91.4 | 108 |
| Affinity PL1880 | 630 | 38 | 46 | 2.8 | 92.4 | 100 |

The haze and the total light transmittance were measured with a 0.2 mm film.

What is claimed is:

1. An ethylene-aromatic vinyl compound copolymer characterized by satisfying the following conditions:
   (1) the aromatic vinyl compound content is from 0.5 mol % to 10 mol %;
   (2) as measured with respect to a molded product having a thickness of 0.2 mm, the haze is at most 14%, or the total light transmittance is at least 90%;
   (3) an ethylene-aromatic vinyl compound copolymer characterized in that the relation of the aromatic vinyl compound content and the glass transition point (Tg) obtained by an inflection point method as observed at a temperature of at least −50° C. by a differential scanning calorimeter (DSC), satisfies the following formula (1):

$$-20+1.00St > Tg > -30+1.05St \qquad \text{Formula (1)}$$

wherein St represents the aromatic vinyl compound content (molar fraction %) in the copolymer; and
   (4) the weight average molecular weight is from 140,000 to 500,000 when the aromatic vinyl compound content is from 5 mol % to 10 mol % and from 60,000 to 500,000 when the content is from 0.5 mol % to less than 5 mol %.

2. The ethylene-aromatic vinyl compound copolymer according to claim 1, which is characterized by satisfying the following further condition:
   (5) the stereoregularity of aromatic groups in the alternating structure of an aromatic vinyl compound and ethylene of the following formula (1) contained in the copolymer structure is such that the isotactic diad index m is larger than 0.55:

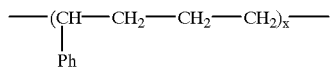

Formula (1)

wherein Ph represents an aromatic group and x represents the number of repeating units and is an integer of at least 2.

3. The ethylene-aromatic vinyl compound copolymer according to claim 1, which is characterized by satisfying the following condition:
   (6) the aromatic vinyl compound content is from 3 mol % to 10 mol %.

4. The ethylene-aromatic vinyl compound copolymer according to claim 3, which is characterized by satisfying the following condition:
   (7) the aromatic vinyl compound content is from 5 mol % to 10 mol %.

5. The ethylene-aromatic vinyl compound copolymer according to claim 1, which is characterized by satisfying the following condition:
   (8) the aromatic vinyl compound content is from 0.5 mol % to 5 mol %.

6. The ethylene-aromatic vinyl compound copolymer according to claim 1, which is characterized in that it is obtainable by means of a catalyst capable of producing a polystyrene having an isotactic stereoregularity by homopolymerization of styrene.

7. The ethylene-aromatic vinyl compound copolymer according to claim 6, wherein the molecular weight distribution is at most 3.0.

8. A molded product made of the ethylene-aromatic vinyl compound copolymer as defined in claim 1.

9. The molded product made of the ethylene-aromatic vinyl compound copolymer according to claim 8, which satisfies at least one of the following conditions:
   (9) the breaking strength is at least 30 MPa;
   (10) the initial tensile modulus is from 25 MPa to 70 MPa at room temperature (23° C.);
   (11) the Shore A hardness is at least 90;
   (12) the elastic recovery from 100% tensile strain at 23° C. is at least 70%;
   (13) the loss tan δ at 0° C. of the dynamic viscoelasticity spectrum measured at a frequency of 10 Hz is from 0.05 to 0.7; and
   (14) the heat of fusion of crystal obtained by DSC is at least 30 J/g.

10. The molded product made of the ethylene-aromatic vinyl compound copolymer as defined in claim 5, which satisfies at least one of the following conditions:
    (15) the melting point as measured by a differential scanning calorimeter (DSC) is from 100° C. to 130° C., and the heat of fusion of crystal is at least 60 J/g; and
    (16) the initial tensile modulus is from 50 MPa to 200 MPa at room temperature (23° C.).

11. The molded product according to claim 8, which is a sheet, a film or a tube.

12. The film according to claim 11, which has a draw ratio of from 1.2 to 50 times at least in one direction.

13. The film according to claim 8, which has a thickness of from 3 μm to 100 μm and a haze of at most 2.5%.

14. A stretch packaging film characterized in that it is made of the film as defined in claim 8.

15. The stretch packaging film according to claim 14, which is for food packaging.

16. The ethylene-aromatic vinyl compound copolymer as claimed in claim 2, wherein the aromatic group Ph in formula (1) is phenyl.

17. The ethylene-aromatic vinyl compound copolymer according to claim 7, wherein the molecular weight distribution is at most 2.5.

18. The molded product according to claim 9, wherein the breaking strength is at least 40 Mpa.

19. The ethylene-aromatic vinyl compound copolymer as claimed in claim 1, wherein said copolymer is an ethylene-aromatic vinyl compound–$C_3$–$C_{20}$ α-olefin copolymer.

20. The ethylene-aromatic vinyl compound copolymer as claimed in claim 1, wherein said copolymer is an ethylene-aromatic vinyl compound–propylene copolymer.

21. The ethylene-aromatic vinyl compound copolymer as claimed in claim 1, wherein said copolymer is an ethylene-aromatic vinyl compound–diene copolymer.

* * * * *

UNITED STATES PATENT AND TRADEMARK OFFICE
CERTIFICATE OF CORRECTION

PATENT NO.   : 6,410,673 B1
DATED        : June 25, 2002
INVENTOR(S)  : Arai et al.

It is certified that error appears in the above-identified patent and that said Letters Patent is hereby corrected as shown below:

Title page,
Item [30], Foreign Application Priority Data, should read
--     [30]            Foreign Application Priority Data
       Oct. 19, 1998   (JP) ......................... 10-297155
       Mar. 15, 1999   (JP) ......................... 11-68662
        Apr. 2, 1999   (JP) ......................... 11-96002 --

Signed and Sealed this

Fourteenth Day of January, 2003

JAMES E. ROGAN
*Director of the United States Patent and Trademark Office*